US012338507B2

(12) United States Patent
Yan et al.

(10) Patent No.: US 12,338,507 B2
(45) Date of Patent: Jun. 24, 2025

(54) METHODS OF RECYCLING ALUMINUM ALLOYS AND PURIFICATION THEREOF

(71) Applicant: ALCOA USA CORP., Pittsburgh, PA (US)

(72) Inventors: Xinyan Yan, Murrysville, PA (US); Francis Caron, Portneuf (CA)

(73) Assignee: ALCOA USA CORP., Pittsburgh, PA (US)

( * ) Notice: Subject to any disclaimer, the term of this patent is extended or adjusted under 35 U.S.C. 154(b) by 560 days.

(21) Appl. No.: 16/235,875

(22) Filed: Dec. 28, 2018

(65) Prior Publication Data

US 2019/0136342 A1 May 9, 2019

Related U.S. Application Data

(63) Continuation of application No. PCT/US2018/000178, filed on Aug. 16, 2018.

(60) Provisional application No. 62/546,491, filed on Aug. 16, 2017.

(51) Int. Cl.
C22B 21/00 (2006.01)
C22B 1/00 (2006.01)
C22B 21/06 (2006.01)

(52) U.S. Cl.
CPC .......... C22B 21/0092 (2013.01); C22B 1/005 (2013.01); C22B 21/0069 (2013.01); C22B 21/06 (2013.01); C22B 21/066 (2013.01)

(58) Field of Classification Search
CPC . C22B 21/0092; C22B 21/0069; C22B 21/06; C22B 21/066; C22B 1/005
See application file for complete search history.

(56) References Cited

U.S. PATENT DOCUMENTS

| | | | | |
|---|---|---|---|---|
| 5,741,348 A | * | 4/1998 | Van Der Donk | ....... C22B 21/06 75/412 |
| 2004/0261572 A1 | * | 12/2004 | De Vries | ................. C22B 21/06 75/10.11 |
| 2013/0105045 A1 | * | 5/2013 | Yan | ........................ C22F 1/043 148/95 |
| 2017/0016092 A1 | | 1/2017 | Yan et al. | |

FOREIGN PATENT DOCUMENTS

| | | | |
|---|---|---|---|
| EP | 1288319 A1 | 3/2003 | |
| JP | HEI 7-70666 | 3/1995 | |
| WO | WO-2016146980 A1 * | 9/2016 | .......... B01F 7/00816 |

(Continued)

OTHER PUBLICATIONS

Dmitri Kopeliovich, Wrought aluminum-manganese alloys (3xxx), Jul. 28, 2012, https://www.substech.com/dokuwiki/doku.php?id=wrought_aluminum-manganese_alloys_3xxx (Year: 2012).*

(Continued)

*Primary Examiner* — Nicholas A Wang
(74) *Attorney, Agent, or Firm* — Greenberg Traurig, LLP

(57) ABSTRACT

The present disclosure relates to methods of producing purified aluminum alloys from aluminum alloy scrap by producing a melt of the aluminum alloy scrap, adding one or more intermetallic former materials, producing iron-bearing intermetallic particles, removing the iron-bearing intermetallic particles, and solidifying the low-iron melt.

20 Claims, 18 Drawing Sheets

(56) References Cited

FOREIGN PATENT DOCUMENTS

WO    WO2017/027734    2/2017

OTHER PUBLICATIONS

De Moraes, H. L., et al., "Removal of Iron from Molten Recycled Aluminum through Intermediate Phase Filtration" *Materials Transactions* 47(7):1731-1736, 2006.

International Search Report and Written Opinion, dated Dec. 21, 2018, from corresponding International Patent App. No. PCT/US2018/000178.

Registration Record Teal Sheets, "International Alloy Designations and Chemical Composition Limits for Wrought Aluminum and Wrought Aluminum Alloys", pp. 1-37, The Aluminum Association, Arlington, VA, Jan. 2015.

Registration Record Series Pink Sheets, "Designations and Chemical Composition Limits for Aluminum Alloys in Form of Casting and Ingot", The Aluminum Association, Arlington, VA, Nov. 2009, 209 pages.

ASM Specialty Handbook: Aluminum and Aluminum Alloys, "Recycling Technology", pp. 47-55, Ed. J.R. Davis & Associates, ASM International, Materials Park, OH, USA, 1993.

\* cited by examiner

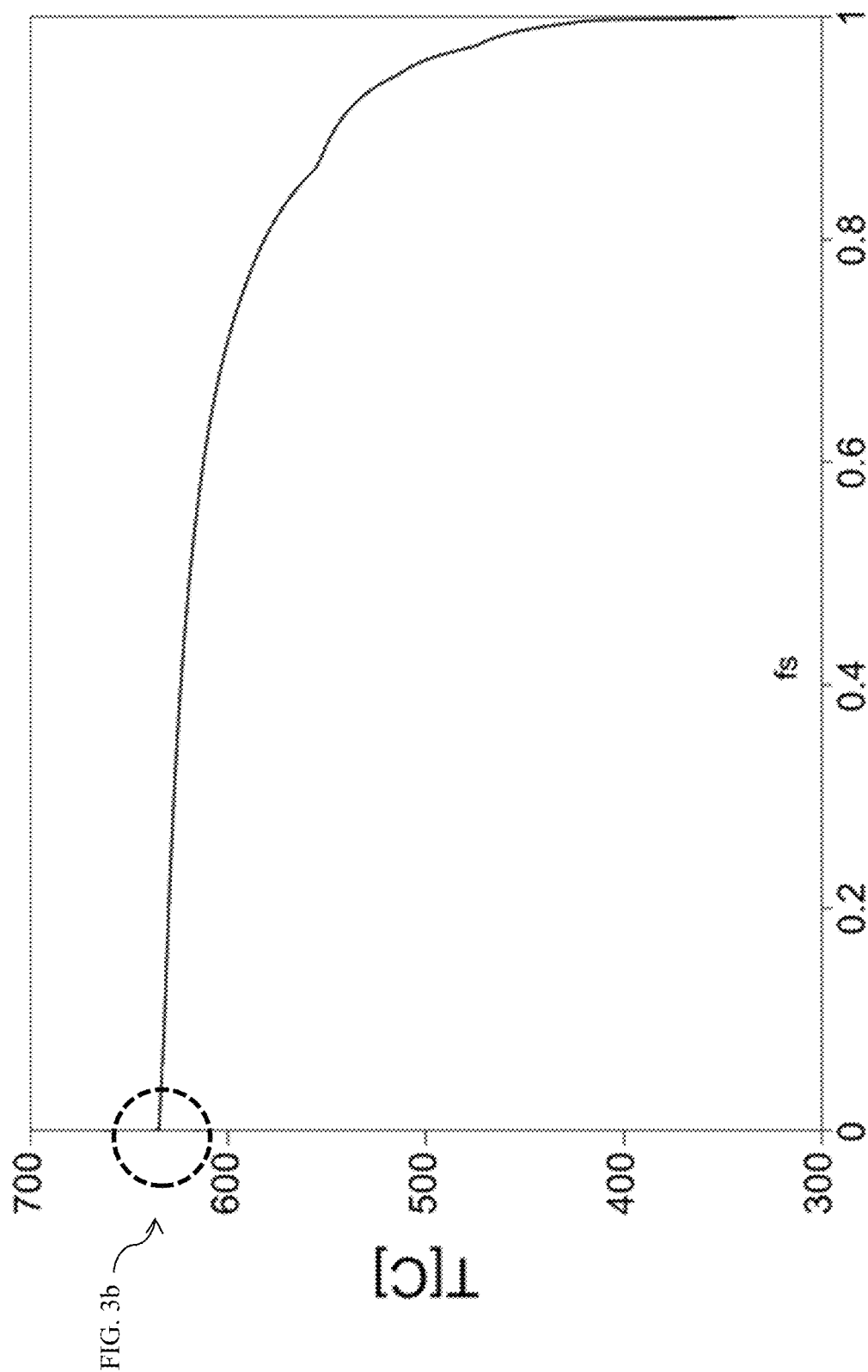

Example 3

| T (°C) | Solid Phase Fraction | Phases | Liquid Elemental Composition (wt. %) | | | | | | | | | | |
|---|---|---|---|---|---|---|---|---|---|---|---|---|---|
| | | | Cr | Cu | Fe | Mg | Mn | Ni | Si | Ti | Zn | Zr |
| 677 | 0 | Liquid, $Al_{15}(Fe:Mn)_3Si_2$ | 0.08 | 0.18 | 0.52 | 0.45 | 1.8 | 0.05 | 9 | 0.04 | 0.11 | 0.01 |
| 628.3 | 0.038 | Liquid, $Al_{15}(Fe:Mn)_3Si_2$ | 0.08 | 0.19 | 0.2 | 0.47 | 0.84 | 0.05 | 8.95 | 0.04 | 0.12 | 0.01 |
| 625.8 | 0.039 | Liquid, $Al_{15}(Fe:Mn)_3Si_2$ | 0.08 | 0.19 | 0.19 | 0.47 | 0.81 | 0.05 | 8.95 | 0.04 | 0.12 | 0.01 |
| 623.2 | 0.04 | Liquid, $Al_{15}(Fe:Mn)_3Si_2$ | 0.08 | 0.19 | 0.18 | 0.47 | 0.77 | 0.05 | 8.95 | 0.04 | 0.12 | 0.01 |
| 620.6 | 0.042 | Liquid, $Al_{15}(Fe:Mn)_3Si_2$, $Al_3Ti$ | 0.08 | 0.19 | 0.17 | 0.47 | 0.74 | 0.05 | 8.94 | 0.04 | 0.12 | 0.01 |
| 618.1 | 0.043 | Liquid, $Al_{15}(Fe:Mn)_3Si_2$, $Al_3Ti$ | 0.08 | 0.19 | 0.16 | 0.47 | 0.71 | 0.05 | 8.94 | 0.04 | 0.12 | 0.01 |
| 615.5 | 0.044 | Liquid, $Al_{15}(Fe:Mn)_3Si_2$, $Al_3Ti$ | 0.08 | 0.19 | 0.15 | 0.47 | 0.68 | 0.05 | 8.94 | 0.04 | 0.12 | 0.01 |
| 613 | 0.045 | Liquid, $Al_{15}(Fe:Mn)_3Si_2$, $Al_3Ti$ | 0.08 | 0.19 | 0.14 | 0.47 | 0.65 | 0.05 | 8.94 | 0.04 | 0.12 | 0.01 |
| 610.4 | 0.046 | Liquid, $Al_{15}(Fe:Mn)_3Si_2$, $Al_3Ti$ | 0.08 | 0.19 | 0.13 | 0.48 | 0.63 | 0.05 | 8.94 | 0.04 | 0.12 | 0.01 |
| 607.8 | 0.047 | Liquid, $Al_{15}(Fe:Mn)_3Si_2$, $Al_3Ti$ | 0.08 | 0.19 | 0.12 | 0.48 | 0.6 | 0.05 | 8.94 | 0.04 | 0.12 | 0.01 |
| 605.3 | 0.048 | Liquid, $Al_{15}(Fe:Mn)_3Si_2$, $Al_3Ti$ | 0.08 | 0.19 | 0.12 | 0.48 | 0.57 | 0.05 | 8.93 | 0.03 | 0.12 | 0.01 |
| 602.7 | 0.049 | Liquid, $Al_{15}(Fe:Mn)_3Si_2$, $Al_3Ti$ | 0.08 | 0.19 | 0.11 | 0.48 | 0.55 | 0.05 | 8.93 | 0.03 | 0.12 | 0.01 |
| 600.2 | 0.077 | Liquid, $Al_{15}(Fe:Mn)_3Si_2$, fcc Al | 0.08 | 0.2 | 0.1 | 0.49 | 0.53 | 0.05 | 9.16 | 0.03 | 0.12 | 0.01 |
| 597.6 | 0.109 | Liquid, $Al_{15}(Fe:Mn)_3Si_2$, fcc Al | 0.08 | 0.2 | 0.1 | 0.5 | 0.52 | 0.06 | 9.44 | 0.01 | 0.12 | 0.01 |

FIG. 7

Example 4

| T (°C) | Solid Phase Fraction | Phases | \multicolumn{10}{c}{Liquid Elemental Composition (wt. %)} |
| --- | --- | --- | --- | --- | --- | --- | --- | --- | --- | --- | --- | --- |
| | | | Cr | Cu | Fe | Mg | Mn | Ni | Si | Ti | Zn |
| 699.9 | 0.000 | Liquid, Al$_3$Ti | 0.1 | 1.03 | 0.37 | 0.58 | 1.4 | 0.03 | 9.27 | 0.12 | 0.12 |
| 658.9 | 0.002 | Liquid, Al$_{15}$(Fe:Mn)$_3$Si$_2$, Al$_3$Ti | 0.1 | 1.03 | 0.36 | 0.58 | 1.38 | 0.03 | 9.28 | 0.07 | 0.12 |
| 625.7 | 0.025 | Liquid, Al$_{15}$(Fe:Mn)$_3$Si$_2$, Al$_3$Ti | 0.1 | 1.06 | 0.18 | 0.6 | 0.82 | 0.03 | 9.26 | 0.04 | 0.12 |
| 623.1 | 0.026 | Liquid, Al$_{15}$(Fe:Mn)$_3$Si$_2$, Al$_3$Ti | 0.1 | 1.06 | 0.17 | 0.6 | 0.78 | 0.03 | 9.26 | 0.04 | 0.12 |
| 620.5 | 0.027 | Liquid, Al$_{15}$(Fe:Mn)$_3$Si$_2$, Al$_3$Ti | 0.1 | 1.06 | 0.16 | 0.6 | 0.75 | 0.03 | 9.26 | 0.04 | 0.12 |
| 618.0 | 0.029 | Liquid, Al$_{15}$(Fe:Mn)$_3$Si$_2$, Al$_3$Ti | 0.1 | 1.07 | 0.15 | 0.6 | 0.72 | 0.03 | 9.26 | 0.04 | 0.12 |
| 615.4 | 0.030 | Liquid, Al$_{15}$(Fe:Mn)$_3$Si$_2$, Al$_3$Ti | 0.1 | 1.07 | 0.14 | 0.6 | 0.69 | 0.03 | 9.26 | 0.04 | 0.12 |
| 612.9 | 0.031 | Liquid, Al$_{15}$(Fe:Mn)$_3$Si$_2$, Al$_3$Ti | 0.1 | 1.07 | 0.13 | 0.6 | 0.66 | 0.03 | 9.26 | 0.04 | 0.12 |
| 610.3 | 0.032 | Liquid, Al$_{15}$(Fe:Mn)$_3$Si$_2$, Al$_3$Ti | 0.1 | 1.07 | 0.13 | 0.6 | 0.63 | 0.03 | 9.26 | 0.03 | 0.12 |
| 607.7 | 0.033 | Liquid, Al$_{15}$(Fe:Mn)$_3$Si$_2$, Al$_3$Ti | 0.1 | 1.07 | 0.12 | 0.6 | 0.61 | 0.03 | 9.26 | 0.03 | 0.12 |
| 605.2 | 0.034 | Liquid, Al$_{15}$(Fe:Mn)$_3$Si$_2$, Al$_3$Ti | 0.1 | 1.07 | 0.11 | 0.6 | 0.58 | 0.03 | 9.26 | 0.03 | 0.12 |
| 602.6 | 0.035 | Liquid, Al$_{15}$(Fe:Mn)$_3$Si$_2$, Al$_3$Ti | 0.1 | 1.07 | 0.1 | 0.6 | 0.56 | 0.03 | 9.25 | 0.03 | 0.13 |
| 600.1 | 0.036 | Liquid, Al$_{15}$(Fe:Mn)$_3$Si$_2$, Al$_3$Ti | 0.1 | 1.07 | 0.1 | 0.61 | 0.53 | 0.03 | 9.25 | 0.03 | 0.13 |
| 597.5 | 0.037 | Liquid, Al$_{15}$(Fe:Mn)$_3$Si$_2$, Al$_3$Ti, AlCrSi(T1) | 0.1 | 1.08 | 0.09 | 0.61 | 0.51 | 0.03 | 9.25 | 0.03 | 0.13 |
| 594.9 | 0.056 | Liquid, Al15(Fe:Mn)3Si2, Al$_3$Ti, AlCrSi(T1), fcc Aluminum | 0.09 | 1.09 | 0.08 | 0.62 | 0.49 | 0.03 | 9.41 | 0.02 | 0.13 |
| 592.4 | 0.086 | Liquid, Al$_{15}$(Fe:Mn)$_3$Si$_2$, Al$_3$Ti, AlCrSi(T1), fcc Aluminum | 0.09 | 1.12 | 0.08 | 0.63 | 0.48 | 0.03 | 9.66 | 0.01 | 0.13 |

FIG. 8

Example 5

| T (°C) | Sold Phase Fraction | Phases | Liquid Elemental Composition (wt. %) | | | | | | | | | | |
|---|---|---|---|---|---|---|---|---|---|---|---|---|---|
| | | | Cr | Cu | Fe | Mg | Mn | Ni | Si | Ti | Zn | Zr |
| 677.2 | 0.000 | Liquid, Al$_{15}$(Fe:Mn)$_3$Si$_2$ | 0.06 | 0.13 | 0.49 | 0.2 | 2.05 | 0.04 | 10.48 | 0.04 | 0.09 | 0.03 |
| 613.2 | 0.049 | Liquid, Al$_{15}$(Fe:Mn)$_3$Si$_2$, Al$_3$Ti | 0.064 | 0.138 | 0.128 | 0.212 | 0.767 | 0.042 | 10.477 | 0.035 | 0.095 | 0.032 |
| 610.6 | 0.050 | Liquid, Al$_{15}$(Fe:Mn)$_3$Si$_2$, Al$_3$Ti | 0.064 | 0.138 | 0.121 | 0.212 | 0.735 | 0.042 | 10.477 | 0.033 | 0.096 | 0.032 |
| 608 | 0.051 | Liquid, Al$_{15}$(Fe:Mn)$_3$Si$_2$, Al$_3$Ti | 0.064 | 0.138 | 0.114 | 0.213 | 0.703 | 0.043 | 10.476 | 0.032 | 0.096 | 0.032 |
| 605.5 | 0.052 | Liquid, Al$_{15}$(Fe:Mn)$_3$Si$_2$, Al$_3$Ti | 0.064 | 0.138 | 0.107 | 0.213 | 0.673 | 0.043 | 10.476 | 0.031 | 0.096 | 0.032 |
| 602.9 | 0.053 | Liquid, Al$_{15}$(Fe:Mn)$_3$Si$_2$, Al$_3$Ti | 0.064 | 0.138 | 0.101 | 0.213 | 0.644 | 0.043 | 10.475 | 0.03 | 0.096 | 0.032 |
| 600.4 | 0.054 | Liquid, Al$_{15}$(Fe:Mn)$_3$Si$_2$, Al$_3$Ti | 0.064 | 0.139 | 0.095 | 0.213 | 0.616 | 0.043 | 10.474 | 0.029 | 0.096 | 0.032 |
| 597.8 | 0.055 | Liquid, Al$_{15}$(Fe:Mn)$_3$Si$_2$, Al$_3$Ti | 0.064 | 0.139 | 0.089 | 0.214 | 0.589 | 0.043 | 10.474 | 0.027 | 0.096 | 0.032 |
| 595.2 | 0.056 | Liquid, Al$_{15}$(Fe:Mn)$_3$Si$_2$, Al$_3$Ti | 0.064 | 0.139 | 0.084 | 0.214 | 0.563 | 0.043 | 10.473 | 0.026 | 0.096 | 0.032 |
| 592.7 | 0.059 | Liquid, Al$_{15}$(Fe:Mn)$_3$Si$_2$, Al$_3$Ti, fcc Al | 0.064 | 0.139 | 0.079 | 0.214 | 0.539 | 0.043 | 10.491 | 0.025 | 0.096 | 0.032 |
| 590.1 | 0.093 | Liquid, Al$_{15}$(Fe:Mn)$_3$Si$_2$, fcc Al | 0.064 | 0.144 | 0.075 | 0.221 | 0.525 | 0.044 | 10.823 | 0.022 | 0.099 | 0.033 |

FIG. 9

Example 6

| T (°C) | Solid Phase Fraction | Phases | Liquid Elemental Composition (wt. %) | | | | | | | | | |
|---|---|---|---|---|---|---|---|---|---|---|---|---|
| | | | Cr | Cu | Fe | Mg | Mn | Ni | Si | Ti | Zn |
| 664.5 | 0 | Liquid, Al$_3$Ti | 0.02 | 0.45 | 0.22 | 0.13 | 0.93 | 0.04 | 9.06 | 0.08 | 0.72 |
| 621.0 | 0.007 | Liquid, Al$_{15}$(Fe:Mn)$_3$Si$_2$, Al$_3$Ti | 0.02 | 0.454 | 0.17 | 0.131 | 0.775 | 0.04 | 9.06 | 0.042 | 0.726 |
| 618.4 | 0.008 | Liquid, Al$_{15}$(Fe:Mn)$_3$Si$_2$, Al$_3$Ti | 0.02 | 0.454 | 0.16 | 0.131 | 0.743 | 0.04 | 9.059 | 0.04 | 0.727 |
| 615.8 | 0.009 | Liquid, Al$_{15}$(Fe:Mn)$_3$Si$_2$, Al$_3$Ti | 0.02 | 0.455 | 0.151 | 0.131 | 0.713 | 0.04 | 9.057 | 0.039 | 0.728 |
| 613.3 | 0.011 | Liquid, Al$_{15}$(Fe:Mn)$_3$Si$_2$, Al$_3$Ti | 0.02 | 0.456 | 0.141 | 0.132 | 0.684 | 0.041 | 9.056 | 0.037 | 0.729 |
| 610.7 | 0.012 | Liquid, Al$_{15}$(Fe:Mn)$_3$Si$_2$, Al$_3$Ti | 0.02 | 0.456 | 0.133 | 0.132 | 0.655 | 0.041 | 9.055 | 0.036 | 0.73 |
| 608.2 | 0.013 | Liquid, Al$_{15}$(Fe:Mn)$_3$Si$_2$, Al$_3$Ti | 0.02 | 0.457 | 0.124 | 0.132 | 0.628 | 0.041 | 9.053 | 0.035 | 0.731 |
| 605.6 | 0.014 | Liquid, Al$_{15}$(Fe:Mn)$_3$Si$_2$, Al$_3$Ti | 0.02 | 0.457 | 0.116 | 0.132 | 0.602 | 0.041 | 9.052 | 0.033 | 0.732 |
| 603.0 | 0.015 | Liquid, Al$_{15}$(Fe:Mn)$_3$Si$_2$, Al$_3$Ti | 0.02 | 0.458 | 0.109 | 0.132 | 0.577 | 0.041 | 9.051 | 0.032 | 0.733 |
| 600.5 | 0.016 | Liquid, Al$_{15}$(Fe:Mn)$_3$Si$_2$, Al$_3$Ti | 0.02 | 0.458 | 0.101 | 0.132 | 0.553 | 0.041 | 9.05 | 0.031 | 0.733 |
| 597.9 | 0.044 | Liquid, Al$_{15}$(Fe:Mn)$_3$Si$_2$, fcc Al | 0.02 | 0.47 | 0.096 | 0.136 | 0.536 | 0.042 | 9.276 | 0.019 | 0.748 |
| 595.4 | 0.076 | Liquid, Al$_{15}$(Fe:Mn)$_3$Si$_2$, fcc Al | 0.02 | 0.484 | 0.091 | 0.139 | 0.521 | 0.043 | 9.548 | 0.011 | 0.764 |

FIG. 10

Example 7

| T (°C) | Solid Phase Fraction | Phases | Liquid Elemental Composition (wt. %) | | | | | | | | | |
|---|---|---|---|---|---|---|---|---|---|---|---|---|
| | | | Cr | Cu | Fe | Mg | Mn | Ni | Si | Ti | Zn | Zr |
| 695.0 | 0 | Liquid, Al$_3$Ti | 0.04 | 1.82 | 0.21 | 0.04 | 0.89 | 0.05 | 9.04 | 0.12 | 0.05 | 0.05 |
| 620.7 | 0.007 | Liquid, Al$_{15}$(Fe:Mn)$_3$Si$_2$, Al$_3$Ti | 0.04 | 1.83 | 0.17 | 0.04 | 0.76 | 0.05 | 9.05 | 0.04 | 0.05 | 0.05 |
| 618.2 | 0.008 | Liquid, Al$_{15}$(Fe:Mn)$_3$Si$_2$, Al$_3$Ti | 0.04 | 1.84 | 0.16 | 0.04 | 0.73 | 0.05 | 9.05 | 0.04 | 0.05 | 0.05 |
| 615.6 | 0.009 | Liquid, Al$_{15}$(Fe:Mn)$_3$Si$_2$, Al$_3$Ti | 0.04 | 1.84 | 0.15 | 0.04 | 0.70 | 0.05 | 9.05 | 0.04 | 0.05 | 0.05 |
| 613.0 | 0.011 | Liquid, Al$_{15}$(Fe:Mn)$_3$Si$_2$, Al$_3$Ti | 0.04 | 1.84 | 0.14 | 0.04 | 0.67 | 0.05 | 9.05 | 0.04 | 0.05 | 0.05 |
| 610.5 | 0.012 | Liquid, Al$_{15}$(Fe:Mn)$_3$Si$_2$, Al$_3$Ti | 0.04 | 1.84 | 0.13 | 0.04 | 0.64 | 0.05 | 9.05 | 0.03 | 0.05 | 0.05 |
| 607.9 | 0.013 | Liquid, Al$_{15}$(Fe:Mn)$_3$Si$_2$, Al$_3$Ti | 0.04 | 1.85 | 0.12 | 0.04 | 0.61 | 0.05 | 9.05 | 0.03 | 0.05 | 0.05 |
| 605.4 | 0.014 | Liquid, Al$_{15}$(Fe:Mn)$_3$Si$_2$, Al$_3$Ti | 0.04 | 1.85 | 0.12 | 0.04 | 0.59 | 0.05 | 9.04 | 0.03 | 0.05 | 0.05 |
| 602.8 | 0.015 | Liquid, Al$_{15}$(Fe:Mn)$_3$Si$_2$, Al$_3$Ti | 0.04 | 1.85 | 0.11 | 0.04 | 0.56 | 0.05 | 9.04 | 0.03 | 0.05 | 0.05 |
| 600.2 | 0.016 | Liquid, Al$_{15}$(Fe:Mn)$_3$Si$_2$, Al$_3$Ti | 0.04 | 1.85 | 0.1 | 0.04 | 0.54 | 0.05 | 9.04 | 0.03 | 0.05 | 0.05 |
| 597.7 | 0.016 | Liquid, Al$_{15}$(Fe:Mn)$_3$Si$_2$, Al$_3$Ti | 0.04 | 1.86 | 0.1 | 0.04 | 0.52 | 0.05 | 9.04 | 0.03 | 0.05 | 0.05 |
| 595.1 | 0.043 | Liquid, Al$_{15}$(Fe:Mn)$_3$Si$_2$, fcc Al | 0.04 | 1.90 | 0.09 | 0.04 | 0.50 | 0.05 | 9.25 | 0.02 | 0.05 | 0.05 |
| 592.6 | 0.073 | Liquid, Al$_{15}$(Fe:Mn)$_3$Si$_2$, fcc Al | 0.04 | 1.95 | 0.09 | 0.04 | 0.49 | 0.05 | 9.5 | 0.01 | 0.05 | 0.05 |

METHODS OF RECYCLING ALUMINUM ALLOYS AND PURIFICATION THEREOF

CROSS-REFERENCE TO RELATED APPLICATION

This application is a continuation of International Patent Application No. PCT/US2018/000178, filed Aug. 16, 2018, which claims the benefit of priority of U.S. Patent Application No. 62/546,491, filed Aug. 16, 2017, entitled "METHODS OF RECYCLING ALUMINUM ALLOYS AND PURIFICATION", each of which is incorporated herein by reference in its entirety.

BACKGROUND

Aluminum alloys are useful in a variety of applications. Some aluminum alloys are also recyclable, and recycling those aluminum alloys preserves energy resources. In the United States and Canada, more than 5 million tons of aluminum are recycled each year.

SUMMARY OF THE INVENTION

Broadly, the present disclosure relates to methods of producing purified aluminum alloys from aluminum alloy scrap. In one embodiment, the produced aluminum alloy is a 3xx aluminum casting alloy. In another embodiment, the produced aluminum alloy is one of a 3xxx or a 4xxx wrought aluminum alloy. Generally, the methods described herein for producing purified aluminum alloys include melting aluminum alloy scrap, adding one or more intermetallic former materials to the melt, and reacting the intermetallic former materials, such as Si and/or Mn, with elemental iron of the aluminum alloy scrap, thereby producing iron-bearing intermetallic particles. The produced iron-bearing intermetallic particles may subsequently be removed (e.g., by filtration). Addition of intermetallic former materials Si and/or Mn may also result in the production of an alloy having an increased amount of Si and/or Mn, resulting in the production of a 3xx aluminum casting alloy, or one of a 3xxx or a 4xxx wrought aluminum alloy. The addition of intermetallic former materials to the melt may result in an increase in the temperature window for removal of the intermetallic particles, which may, accordingly, increase the volume fraction of iron-bearing intermetallic particles available for removal. Thus, the addition of the intermetallic former materials to the melt may facilitate production of suitable end-use alloys, may facilitate the removal of iron from aluminum scrap in an industrially applicable temperature window, and may facilitate the reduction of the iron content in the aluminum alloy.

In one embodiment, and referring now to FIG. 1a, aluminum scrap is melted (120) by conventional methods and intermetallic former materials may be added to the melt (130). The addition of intermetallic former materials may result in the production of iron-bearing intermetallic particles (140), such as by a reaction of the intermetallic former materials with iron within the melt (141). After or during their formation, the iron-bearing intermetallic particles may be removed by any suitable method, such as, but not limited to filtration or sedimentation (150). Finally, the melt is solidified (160) and a purified aluminum alloy is produced (161).

More particularly, and referring now to FIG. 1b, aluminum alloy scrap having an initial iron (Fe) content (111) may be received for recycling (110). For instance, the initial iron content may be at least 0.2 wt. % iron (Fe) (112). In one embodiment, the initial iron content is at least 0.3 wt. % iron (Fe). In another embodiment, the initial iron content is at least 0.4 wt. % iron (Fe). In yet another embodiment, the initial iron content is at least 0.5 wt. % iron (Fe). In another embodiment, the initial iron content is at least 0.6 wt. % iron (Fe). In yet another embodiment, the initial iron content is at least 0.7 wt. % iron (Fe). In another embodiment, the initial iron content is at least 0.8 wt. % iron (Fe). In yet another embodiment, the initial iron content is at least 0.9 wt. % iron (Fe). In another embodiment, the initial iron content is at least 1.0 wt. % iron (Fe). In yet another embodiment, the initial iron content is at least 1.5 wt. % iron (Fe). In another embodiment, the initial iron content is at least 2.0 wt. % iron (Fe). In another embodiment, the initial iron content is at least 2.5 wt. % iron (Fe). In yet another embodiment, the initial iron content is at least 3.0 wt. % iron (Fe).

The aluminum alloy scrap is melted (120) by conventional methods, and intermetallic former materials such as, silicon (Si) and/or manganese (Mn), may be added to the melt (131). The addition of the intermetallic former materials is sufficient to produce iron-bearing intermetallic particles in the melt (140), such as by a reaction between the Si and/or Mn with the iron in the melt (141). The production may occur as a result of cooling the melt from a first temperature to a second temperature. In some embodiments, the first temperature is the liquidus temperature of the melt. In other embodiments, the first temperature is greater than the liquidus temperature of the melt. In some embodiments, the second temperature is greater than the solidification temperature of fcc aluminum. In some embodiments, the second temperature is below the solidification temperature of fcc aluminum, and above the solidus temperature of the melt. The addition of the intermetallic former materials (130) may be sufficient to realize an increase in the difference between the liquidus temperature of the melt and the solidification temperature of fcc aluminum (e.g., a purification temperature window, $\Delta T$) (132). In this regard, the iron-bearing intermetallic particles may form in the temperature window. Generally, due to the addition of the intermetallic former materials (130), the temperature window between the first and second temperatures is at least 10° C. (133). Within the temperature window (and sometimes at or below the second temperature), intermetallic particles may be removed (150) by methods including, but not limited to, filtration and sedimentation of the melt. Following removal (150), the now low-iron melt is solidified thereafter (160) (e.g., cooled to below the solidus temperature of the low-iron melt). Due to the addition of intermetallic former materials (130), production of iron-bearing intermetallic particles (140), and removal of at least some of the iron-bearing intermetallic particles (150), solidifying the low-iron melt (160) produces a purified aluminum alloy (161). In one embodiment, one of a 3xxx or a 4xxx wrought aluminum alloy may be produced (162). In another embodiment, a 3xx casting aluminum alloy may be produced (163). The purified aluminum alloy may have an iron content less than the initial iron content (164), due to the removal (150) of the iron-bearing particles. For instance, the iron content of the purified aluminum alloy may be not greater than 0.5 wt. % iron (Fe) (165).

As described above, intermetallic former materials are added to the melt (131), and iron-bearing intermetallic particles are produced in the melt (140). In one embodiment, intermetallic particles having the composition of $Al_{15}(Fe:Mn)_3Si_2$ may form in the melt, and the temperature window may lie between the liquidus of the melt and the solidification temperature of fcc aluminum. In this regard, the $Al_{15}$ (Fe:Mn)$_3$Si$_2$ particles may solidify below the liquidus (i.e., the Al$_{15}$(Fe:Mn)$_3$Si$_2$ is the first solid to form below the liquidus). In one embodiment, due to the addition of intermetallic former materials Si and/or Mn, iron-bearing intermetallic particles Al$_{15}$(Fe:Mn)$_3$Si$_2$ are removed (150), and the temperature window between the liquidus of the melt and the solidification temperature of fcc aluminum is at least 10° C. (133).

The aluminum alloy scrap may be received (110) in a variety of forms. For instance the aluminum alloy scrap may be received as automotive scrap, aerospace scrap, beverage can scrap, electronic scrap, municipal scrap, and the like where aluminum alloys may find industrial applicability. In this regard, the aluminum alloy scrap may be aggregated from any of the types of scrap (e.g., mixed-stream scrap). In one embodiment, the aluminum alloy scrap is a mixed-stream aluminum alloy scrap. Similarly, scrap aluminum alloy may be produced as a part of regular production of casting of ingot, billet, or the shape casting of components. In this regard the aluminum alloy scrap may be comprised of at least a first scrap and a second scrap, wherein the first scrap and second scrap are heterogeneous (e.g., having relatively different compositions). In some embodiments, the aluminum alloy scrap comprises at least a first scrap and a second scrap having relatively different compositions.

The melting (120) may be accomplished by any suitable method, such as conventional methods known in the art. Following the melting (120), the addition of intermetallic former materials may occur at any suitable time. For instance, the addition may occur (a) prior to melting, (b) during melting of the scrap, or (c) after the scrap is above its liquidus temperature (e.g., after melting). Furthermore, the intermetallic former materials may be added as any suitable form. For instance, the intermetallic former material(s) may be added in a relatively pure form. For example, silicon may be added as relatively pure silicon, and manganese may be added as relatively pure manganese. Additionally, intermetallic former material-containing alloys may be used as a source of the intermetallic former material. For instance, silicon-containing aluminum alloys or manganese-containing aluminum alloys may be added to increase the silicon and/or manganese content of the melt. In one embodiment, intermetallic former material manganese may be added as manganese master alloy (e.g., Mn>10 wt. %, the balance being essentially aluminum).

In addition to the relatively pure forms of intermetallic former materials, the intermetallic former materials may be added as scrap themselves. For instance, the aluminum alloy scrap may include at least a first and second scrap. In this regard, a first scrap may be an aluminum alloy scrap having insufficient intermetallic former materials to realize removal of iron-bearing intermetallic particles. A second scrap may be an aluminum alloy scrap having sufficient intermetallic former materials, when combined with at least a first scrap, to realize removal of iron-bearing intermetallic particles. Furthermore, the processes described herein may not be limited to the addition of at least a first and second scrap. For instance, a first and second scrap may comprise the aluminum alloy scrap, and additional intermetallic former materials may be added in other forms to realize the removal and/or an increased removal of iron-bearing intermetallic particles, relative to the at least first and second scrap.

As noted above, the addition of intermetallic formers (e.g., silicon (Si) and/or manganese (Mn) (131)) may be sufficient to realize an increase in the difference between the liquidus temperature of the melt and the solidification temperature of fcc aluminum (sometimes referred to herein as a "purification temperature window") (132). The iron-bearing intermetallic particles may be removed in the at least 10° C. purification temperature window (133). In one embodiment, the purification temperature window is at least 15° C. In another embodiment, the purification temperature window is at least 20° C. In yet another embodiment, the purification temperature window is at least 30° C. In another embodiment, the purification temperature window is at least 40° C. In yet another embodiment, the purification temperature window is at least 50° C. In another embodiment, the purification temperature window is at least 60° C. In yet another embodiment, the purification temperature window is at least 70° C. In another embodiment, the purification temperature window is at least 80° C. In yet another embodiment, the purification temperature window is at least 100° C.

After, or during their production, the iron-bearing intermetallic particles may be removed (150) by suitable methods, such as, but not limited to filtration or sedimentation, and combinations thereof. For example, filtration of the iron-bearing intermetallic particles may be performed using a variety of filters, such as filters made from refractory filter materials. Suitable refractory filter materials may include, but are not limited to, alumina, silica, silicon carbide, silicon nitride, calcium oxide, graphite, carbon, among others. In some embodiments, the iron-bearing intermetallic particles are removed by filtration, wherein the filtration comprises at least one refractory filter material. In this regard, multiple refractory filter materials may be used in one filter to facilitate removal of iron-bearing intermetallic particles from the melt. Some suitable refractory filters are disclosed in U.S. Pat. No. 5,126,047.

The processes described herein may generally result in a solidified (160), purified aluminum alloy (161) having a purified iron content, wherein the purified iron content is less than the initial iron content of the aluminum alloy scrap (164). In one approach, the processes may result in a purified aluminum alloy having at least 10% less iron than the aluminum alloy scrap. By way of non-limiting example, aluminum alloy scrap having an initial iron content of 0.8 wt. % may be purified to have 10% less iron. Thus, in this non-limiting example, the purified iron content would be 0.8 wt. %*(100%–10%)=0.72 wt. % iron (Fe). In one embodiment, the purified iron content is 15% less than the initial iron content. In another embodiment, the purified iron content is 20% less than the initial iron content. In yet another embodiment, the purified iron content is 25% less than the initial iron content. In another embodiment, the purified iron content is 35% less than the initial iron content. In yet another embodiment, the purified iron content is 45% less than the initial iron content. In another embodiment, the purified iron content is 60% less than the initial iron content. In yet another embodiment, the purified iron content is 75% less than the initial iron content. In another embodiment, the purified iron content is 85% less than the initial iron content.

In another approach, purified aluminum alloys may include not greater than 1.80 wt. % iron (Fe) (165). In one embodiment, a purified aluminum alloy includes not greater than 1.5 wt. % iron (Fe). In another embodiment, a purified aluminum alloy includes not greater than 1.2 wt. % iron (Fe). In yet another embodiment, a purified aluminum alloy includes not greater than 1.0 wt. % iron (Fe). In another embodiment, a purified aluminum alloy includes not greater than 0.8 wt. % iron (Fe). In yet another embodiment, a purified aluminum alloy includes not greater than 0.5 wt. % iron (Fe). In another embodiment, a purified aluminum alloy includes not greater than 0.40 wt. % iron (Fe). In yet another embodiment, a purified aluminum alloy includes not greater than 0.35 wt. % iron (Fe). In another embodiment, a purified aluminum alloy includes not greater than 0.30 wt. % iron (Fe). In yet another embodiment, a purified aluminum alloy includes not greater than 0.25 wt. % iron (Fe). In another embodiment, a purified aluminum alloy includes not greater than 0.20 wt. % iron (Fe). In yet another embodiment, a purified aluminum alloy includes not greater than 0.15 wt. % iron (Fe). In another embodiment, a purified aluminum alloy includes not greater than 0.12 wt. % iron (Fe). In yet another embodiment, a purified aluminum alloy includes not greater than 0.10 wt. % iron (Fe).

Regarding solidification (160), a purified aluminum alloy (161) may be cast from the low-iron melt as a shape cast component, or may be cast as ingot/billet. Cast ingot or billet may also be re-melted at a later time for use in shape casting. Additionally, a cast ingot or billet may be re-melted, and combined with other materials to produce a target aluminum alloy composition. For instance, relatively pure aluminum may be added, and/or other alloying additions may be added to produce the desired aluminum alloy. A cast ingot or billet may be worked, for instance, by hot working and/or cold working via any of rolling, forging, extrusion, as well as stress relief by compression and/or stretching. Shape casting of the purified aluminum alloy may include any suitable shape casting method, including permanent mold casting, high pressure die casting, sand mold casting, investment casting, squeeze casting and semi-solid casting, among others.

The purified aluminum alloy may be a Si-based aluminum alloy. For instance, Si-based aluminum alloys may include 3xx casting aluminum alloys or 4xxx wrought aluminum alloys. As part of the purification processes described herein, silicon (Si) may be added to the melt, and consequently, at least some of the silicon (Si) may remain in the purified aluminum alloy. Purified aluminum alloys may generally include at least 3.0 wt. % silicon (Si). In one embodiment, a purified aluminum alloy includes at least 4.0 wt. % silicon (Si). In another embodiment, a purified aluminum alloy includes at least 5.0 wt. % silicon (Si). In yet another embodiment, a purified aluminum alloy includes at least 6.0 wt. % silicon (Si). In another embodiment, a purified aluminum alloy includes at least 6.5 wt. % silicon (Si). In yet another embodiment, a purified aluminum alloy includes at least 7.0 wt. % silicon (Si). In another embodiment, a purified aluminum alloy includes at least 7.5 wt. % silicon (Si). In yet another embodiment, a purified aluminum alloy includes at least 8.5 wt. % silicon (Si). In another embodiment, a purified aluminum alloy includes at least 9.0 wt. % silicon (Si). In one embodiment, a purified aluminum alloy includes not greater than 23.0 wt. % silicon (Si). In another embodiment, a purified aluminum alloy includes not greater than 20.0 wt. % silicon (Si). In yet another embodiment, a purified aluminum alloy includes not greater than 15.0 wt. % silicon (Si).

As used herein, a "3xx aluminum alloy" means an aluminum casting alloy comprising silicon (Si) as the predominate alloying ingredient, as defined by the Aluminum Association document "Designations and Chemical Composition Limits for Aluminum Alloys in the Form of Castings and Ingot" (2009) (a.k.a., "the Pink Sheets").

As used herein, a "4xxx aluminum alloy" means a wrought aluminum alloy comprising silicon (Si) as the predominate alloying ingredient, as defined by the Aluminum Association document "International Alloy Designations and Chemical Composition Limits for Wrought Aluminum and Wrought Aluminum Alloys" (2015) (a.k.a., the "Teal Sheets").

In one embodiment, the methods for producing purified aluminum alloys described herein are used to produce aluminum alloys consistent with the aluminum alloys disclosed in commonly owned U.S. Patent Publication No. 2013/0105045. In another embodiment, the methods for producing purified aluminum alloys described herein are used to produce aluminum alloys consistent with the aluminum alloys disclosed in commonly owned U.S. Patent Publication No. 2017/0016092. In yet another embodiment, the methods for producing purified aluminum alloys described herein are used to produce aluminum alloys consistent with the aluminum alloys disclosed in commonly owned WIPO International Publication No. 2017/027734.

The purified aluminum alloy may be a Mn-based aluminum alloy. For instance, Mn based aluminum alloys may include 3xxx wrought aluminum alloys. As part of the purification processes described herein, manganese (Mn) may be added to the melt, and consequently, at least some of the manganese (Mn) may remain in the purified aluminum alloy. Purified aluminum alloys may generally include at least 0.05 wt. % manganese (Mn). In one embodiment, a purified aluminum alloy includes at least 0.10 wt. % manganese (Mn). In another embodiment, a purified aluminum alloy includes at least 0.20 wt. % manganese (Mn). In yet another embodiment, a purified aluminum alloy includes at least 0.30 wt. % manganese (Mn). In another embodiment, a purified aluminum alloy includes at least 0.40 wt. % manganese (Mn). In one embodiment, a purified aluminum alloy includes not greater than 1.8 wt. % manganese (Mn). In another embodiment, a purified aluminum alloy includes not greater than 1.5 wt. % manganese (Mn). In yet another embodiment, a purified aluminum alloy includes not greater than 1.2 wt. % manganese (Mn). In another embodiment, a purified aluminum alloy includes not greater than 0.9 wt. % manganese (Mn). In yet another embodiment, a purified aluminum alloy includes not greater than 0.8 wt. % manganese (Mn). In another embodiment, a purified aluminum alloy includes not greater than 0.7 wt. % manganese (Mn). In yet another embodiment, a purified aluminum alloy includes not greater than 0.4 wt. % manganese (Mn).

As used herein, a "3xxx aluminum alloy" means a wrought aluminum alloy comprising manganese (Mn) as the predominate alloying ingredient, as defined by the Aluminum Association document "International Alloy Designations and Chemical Composition Limits for Wrought Aluminum and Wrought Aluminum Alloys" (2015) (a.k.a., the "Teal Sheets").

Also, as used herein, the term "3xxx aluminum alloy" or "4xxx aluminum alloy" only refers to the composition and not any associated processing, i.e., as used herein either a 3xxx aluminum alloy or 4xxx aluminum alloy does not need to be a wrought product to be considered a 3xxx or 4xxx aluminum alloy composition.

To facilitate production of suitable aluminum alloy products, other alloying additions may be added to the melt, such as being added (a) to the melt prior to removing the iron-bearing intermetallic particles and/or (b) to the melt after removing the iron-bearing intermetallic particles. Alternatively, other alloying additions may be added (c) during or (d) after re-melting of the purified aluminum alloy, such as, prior to shape casting, or casting as ingot/billet. Alloying additions may be added to tailor the physical properties (e.g., tensile properties; toughness; corrosion resistance; others) of a purified aluminum alloy.

As used herein, "other alloying additions" or "alloying additions" means elements other than aluminum, silicon, iron, and manganese, that may be purposefully added to the melt (e.g., to produce a pre-selected target composition and, ultimately, a pre-selected solidified alloy product). The other alloying additions may be added to facilitate the realization of desired physical properties of a pre-selected target composition. Other alloying addition elements include chromium (Cr), nickel (Ni), zinc (Zn), titanium (Ti), tin (Sn), and strontium (Sr), among others. In one embodiment, the alloying additions comprise at least one of copper (Cu) or magnesium (Mg).

Components may be produced from the purified aluminum alloys. For instance, components may be shape cast using the purified aluminum alloys. Components made from the purified aluminum alloys may be used in any suitable application, such as in any of an automotive, aerospace, industrial or commercial transportation application, among others. In one embodiment, the purified aluminum alloy component is an automotive part (e.g., a body-in-white (BIW) part; a suspension part). In one embodiment, the purified aluminum alloy component is included in an automobile. In one embodiment, the purified aluminum alloy component is an aerospace component. In one embodiment, the purified aluminum alloy component is included in an aerospace vehicle. In one embodiment, the purified aluminum alloy component is an industrial component. In one embodiment, the purified aluminum alloy component is a commercial transportation component. In one embodiment, the purified aluminum alloy component is included in a commercial transportation vehicle.

The use of tailored additions of intermetallic former materials, optionally with other alloying additions, facilitates the production of predetermined, low-iron, aluminum alloys from aluminum alloy scrap. In one embodiment, and referring now to FIG. 1c, a target purified aluminum alloy composition is pre-selected (210) for production using the methods described herein. In this regard, the pre-selected target composition may be a 3xx cast aluminum alloy, or one of a 3xxx or 4xxx wrought aluminum alloy. Based on the pre-selection step and composition of the aluminum alloy scrap, a particular amount of intermetallic former materials may be added to the aluminum alloy scrap (220). The aluminum alloy scrap composition may be determined (221) prior to adding the particular amount of intermetallic former materials and/or other alloying additions. In this manner, the particular amount of intermetallic former materials may be sufficient to realize removal of iron-bearing intermetallic particles (225). The particular amount of intermetallic former materials that may be added may be chosen using any suitable method. In this regard, the addition of intermetallic former materials may be chosen on a basis of experimental results, or may be chosen on a basis of recycling simulations (e.g., modeling), among others. For instance, a database of simulations may be utilized to calculate an appropriate amount of intermetallic former materials sufficient to realize removal of iron-bearing intermetallic particles. After removal of the iron-bearing intermetallic particles (225) using the methods described herein and/or use of any other alloying additions (222), a purified aluminum alloy having the pre-selected target composition may be produced. As one may appreciate, a target composition may be considered a composition range.

BRIEF DESCRIPTION OF THE DRAWINGS

FIG. 3a is a solidification pathway diagram of MIC6® alloy of Example 1, generated by Pandat®, for a solid fraction of from 0 to 1.

FIG. 7 is a data table for the recycling simulation of Example 3 showing the solid phase fraction, the liquid aluminum composition, and the precipitation phases.

FIG. 8 is a data table for the recycling simulation of Example 4 showing the solid phase fraction, the liquid aluminum composition, and the precipitation phases.

FIG. 9 is a data table for the recycling simulation of Example 5 showing the solid phase fraction, the liquid aluminum composition, and the precipitation phases.

FIG. 10 is a data table for the recycling simulation of Example 6 showing the solid phase fraction, the liquid aluminum composition, and the precipitation phases.

FIG. 11 is a data table for the recycling simulation of Example 7 showing the solid phase fraction, the liquid aluminum composition, and the precipitation phases.

DETAILED DESCRIPTION

Example 1

A recyclable aluminum alloy of MIC6® was cast as ingot. Table 1a gives a typical composition of aluminum alloy MIC6®.

TABLE 1a

Composition of Aluminum Alloy MIC6 ®

| Element | Composition (wt. %) |
|---|---|
| Si | 1.05 |
| Fe | 0.53 |
| Cu | 1.3 |
| Mn | 0.75 |
| Mg | 1.65 |
| Zn | 2.5 |
| Cr | 0.16 |
| Al | Balance |

Figure 1A:
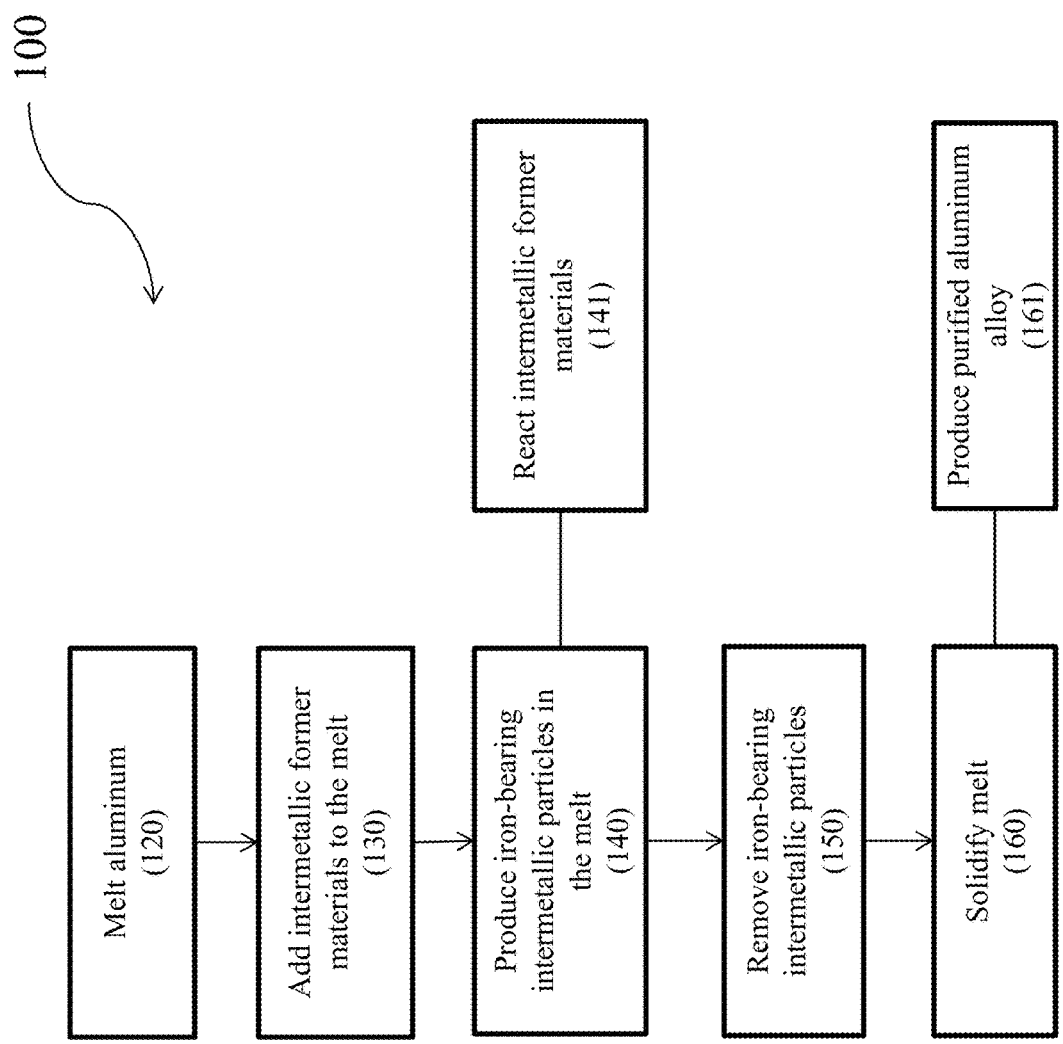
FIG. 1a is an embodiment of producing a purified aluminum alloy.
Figure 1B:
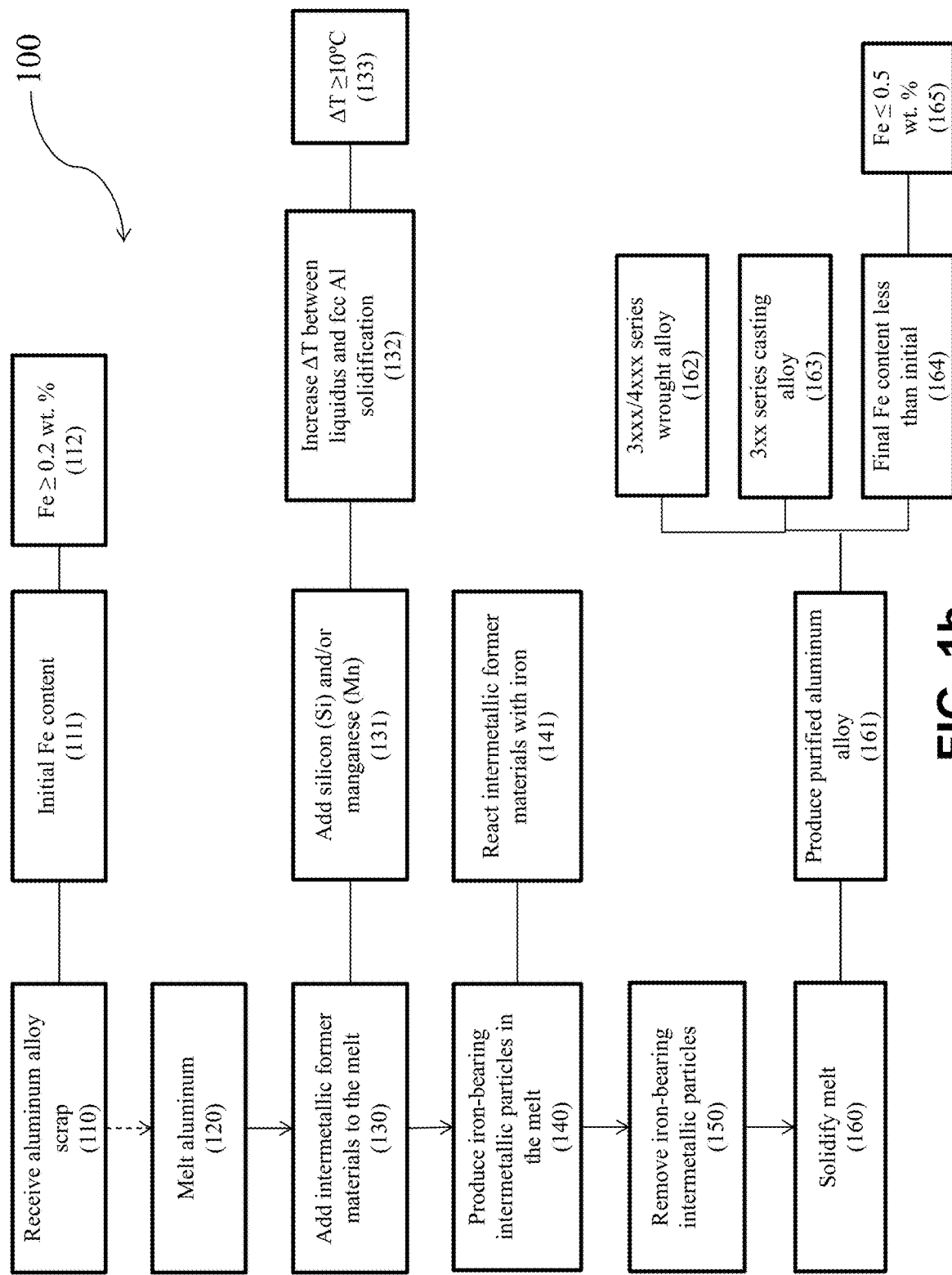
FIG. 1b is an embodiment of producing a purified aluminum alloy using intermetallic former materials silicon (Si) and/or manganese (Mn).
Figure 1C:
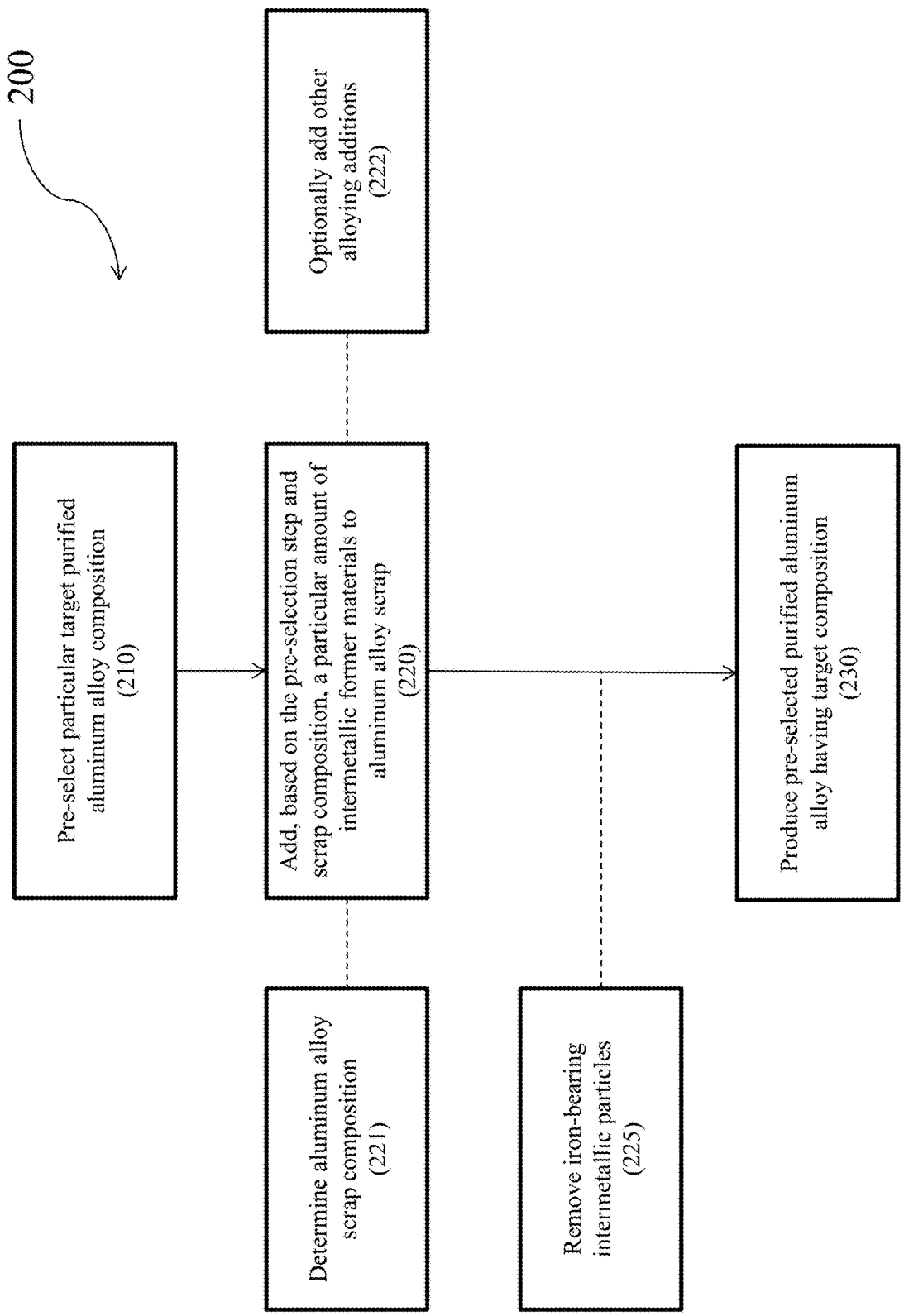
FIG. 1c is an embodiment of producing a purified aluminum alloy having a pre-selected target composition.
Figure 2B:
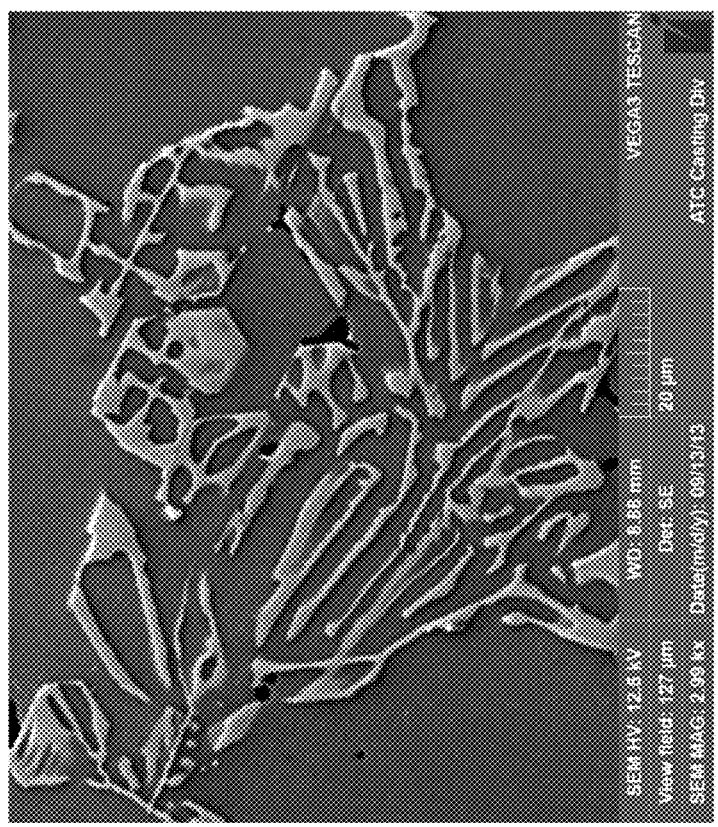
FIG. 2b is a micrograph of as-cast MIC6® alloy, taken at 3000× magnification.
Figure 2A:
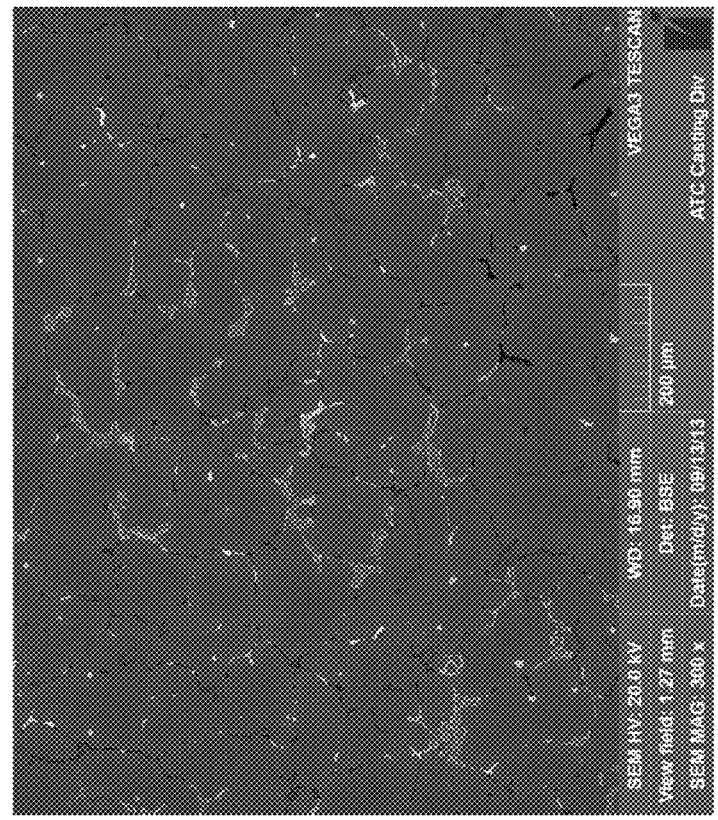
FIG. 2a is a micrograph of as-cast MIC6® alloy, taken at 300× magnification.
Figure 3B:
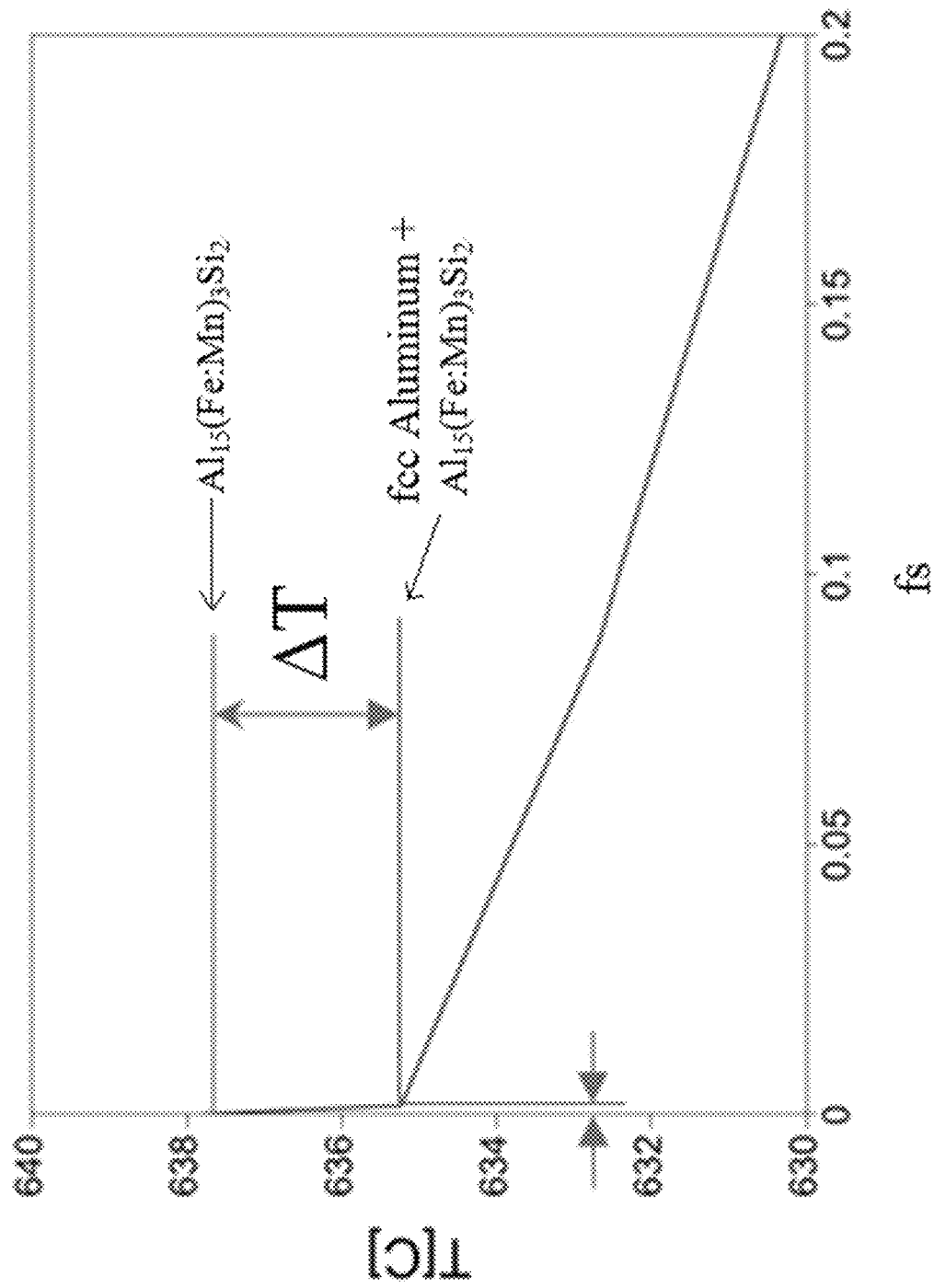
FIG. 3b is a solidification pathway diagram of MIC6® alloy of Example 1, generated by Pandat®, for a solid fraction of from 0 to 0.2.

Micrographs were taken of the as-cast aluminum alloy. Micrographs taken at 300× and 3000× magnification are shown in FIGS. 2a and 2b, respectively. As shown, the as-cast microstructure of the aluminum alloy contains an intermetallic phase. The intermetallic phase exhibited a Chinese script-like structure, and was identified as $Al_{15}(Fe:Mn)_3Si_2$ using SEM-EDX analysis. The composition of the intermetallic phase was further confirmed by constructing a Pandat® phase diagram using the composition given in Table 1, and analyzing the solidification pathway. The phase diagram constructed by Pandat®, as shown in FIG. 3a-3b, illustrates the solidification pathway. As shown in FIG. 3b, a small purification temperature window of 2.5° C. exists where solid intermetallic $Al_{15}(Fe:Mn)_3Si_2$ forms absent of solid aluminum. In principle, intermetallic $Al_{15}(Fe:Mn)_3Si_2$ particles can be separated from the liquid phase (e.g., by filtration) in the 2.5° C. temperature window. However, in practice, the temperature window (2.5° C.) is too small to achieve a significant separation.

Figure 4A:
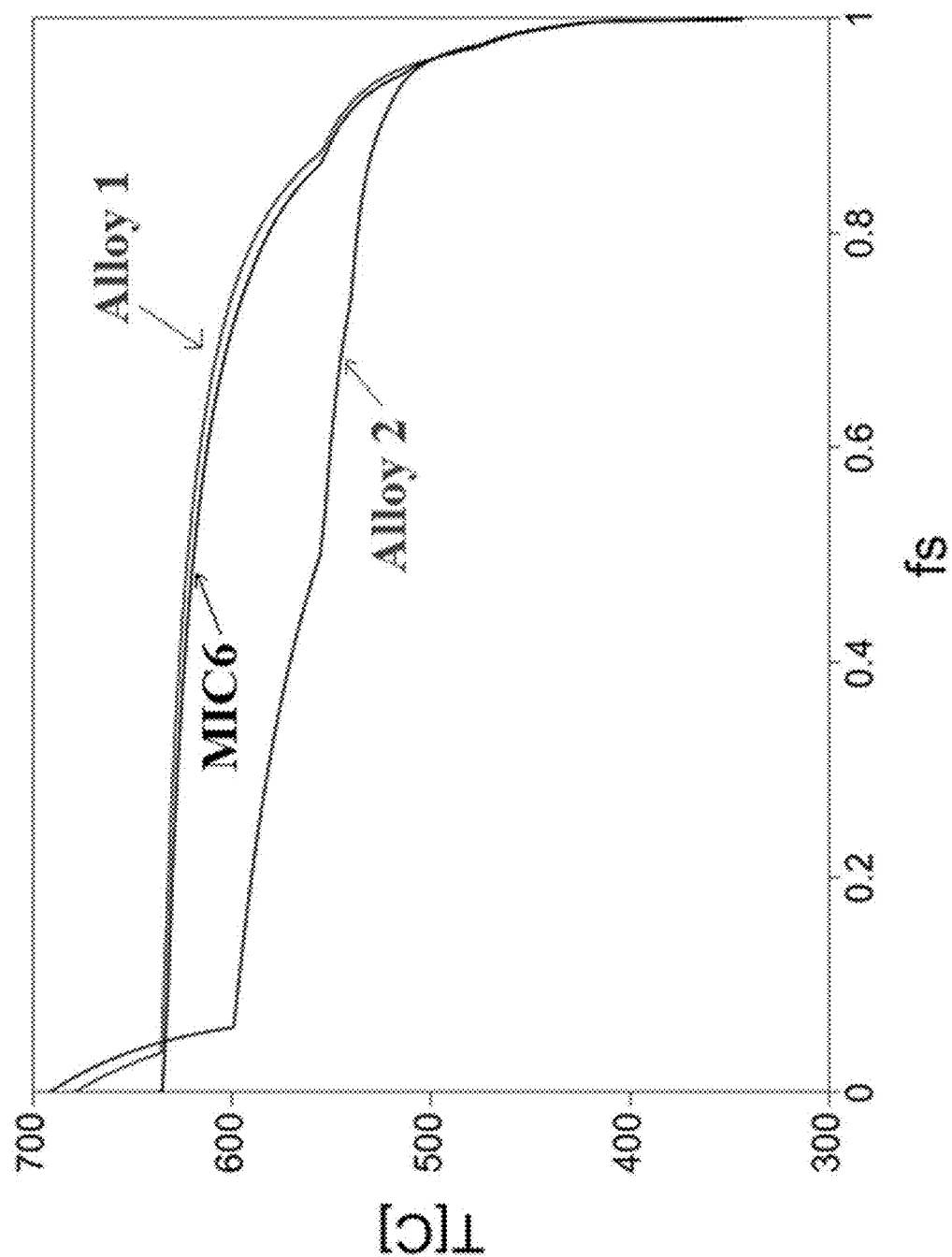
FIG. 4a is a solidification pathway diagram for MIC6®, Alloy 1, and Alloy 2 of Example 1, generated by Pandat®, for a solid fraction of from 0 to 1.
Figure 4B:
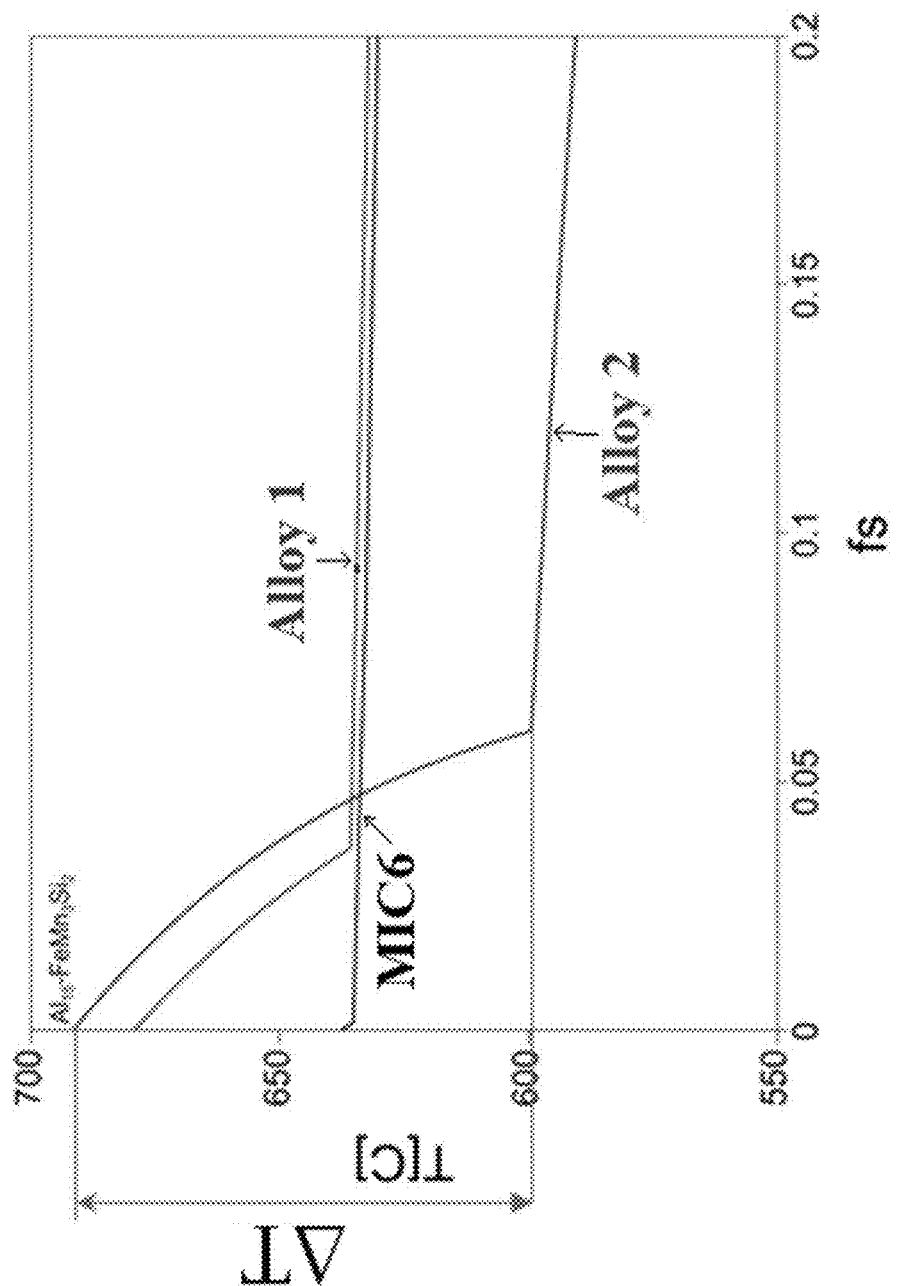
FIG. 4b is a solidification pathway diagram for MIC6®, Alloy 1, and Alloy 2 of Example 1, generated by Pandat®, for a solid fraction of from 0 to 0.2.

The addition of intermetallic formers silicon and manganese to the MIC6® alloy modifies the solidification pathway. As shown in Table 1b and FIGS. 4a-4b, adding manganese ("Alloy 1") and a combination of silicon and manganese ("Alloy 2") increases the purification temperature window ($\Delta T$) and the solid fraction of intermetallic $Al_{15}(Fe:Mn)_3Si_2$.

TABLE 1b

Effect of Intermetallic Formers on Alloy MIC6 ®

| Alloy | Composition, wt % | | | | | | | | $\Delta T$ (° C.) | $Al_{15}(Fe:Mn)_3Si_2$ Solid Phase Fraction (v/v %) |
|---|---|---|---|---|---|---|---|---|---|---|
| | Si | Mn | Cu | Fe | Mg | Zn | Cr | Al | | |
| MIC6 | 1.05 | 0.75 | 1.3 | 0.53 | 1.65 | 2.5 | 0.16 | bal. | 2.5 | 0.02 |
| Alloy 1 | 1.05 | 2.00 | 1.3 | 0.53 | 1.65 | 2.5 | 0.16 | bal. | 43.5 | 3.77 |
| Alloy 2 | 8.00 | 2.00 | 1.3 | 0.53 | 1.65 | 2.5 | 0.16 | bal. | 97.3 | 6.1 |

Figure 5:
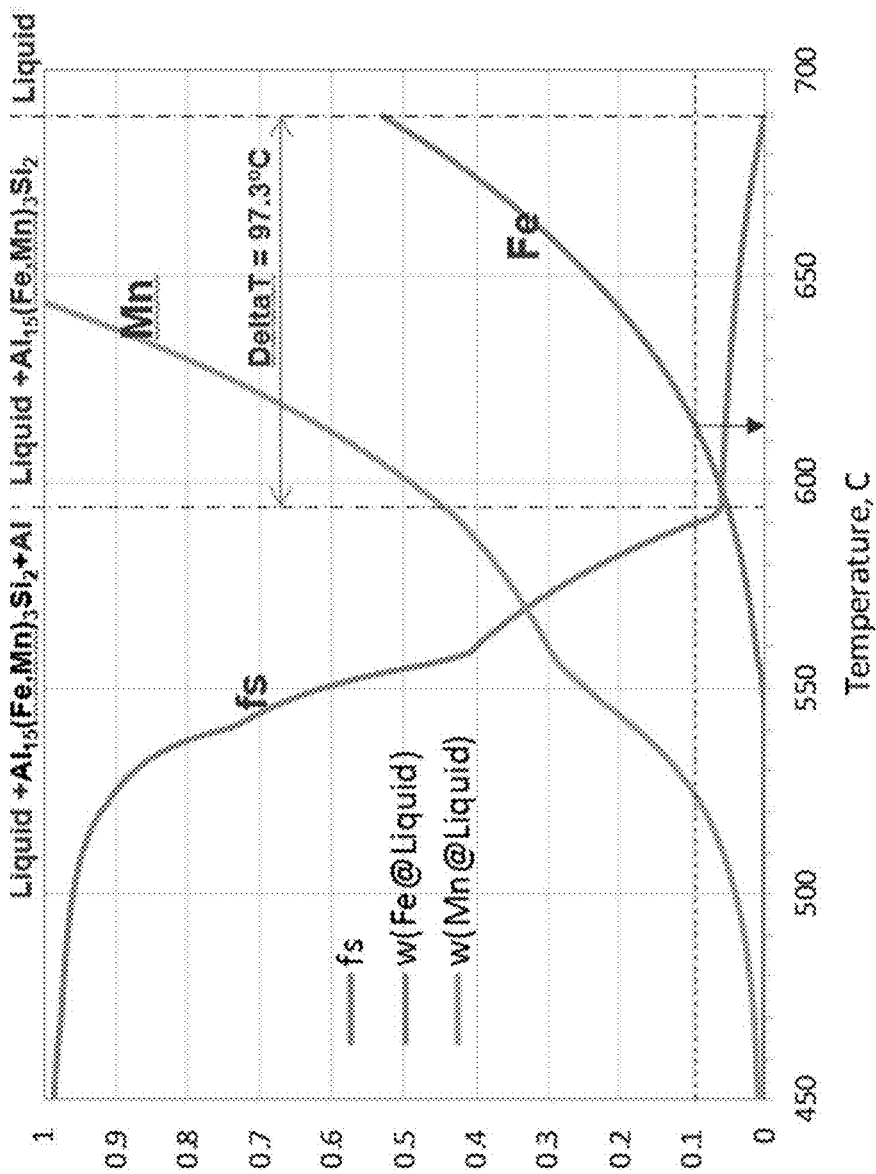
FIG. 5 is a plot of a solidification pathway diagram and the liquid aluminum Mn and Fe composition in the liquid aluminum, generated by Pandat®, for a solid fraction of from 0 to 1.

The solid fraction, iron and manganese compositions in the bulk aluminum, and phase change temperatures for Alloy 2 are shown in FIG. 5. As illustrated, intermetallic $Al_{15}(Fe:Mn)_3Si_2$ begins to form at approximately 690° C. At 592° C., solid aluminum (fcc) forms in equilibrium with the intermetallic and liquid phases. Thus, there is a temperature window of approximately 97° C., from 592° C. to 690° C., where intermetallic $Al_{15}(Fe:Mn)_3Si_2$ particles can be separated from the liquid aluminum phase absent of solid aluminum. This purification temperature window of approximately 97° C. is sufficient to separate the intermetallic particles from the bulk liquid aluminum. In one approach, the purification temperature window is at least 10° C. in order to separate the intermetallic particles from the bulk liquid aluminum.

As shown in FIG. 5, iron can be reduced in the bulk aluminum by adding intermetallic formers, and removing the intermetallic $Al_{15}(Fe:Mn)_3Si_2$ particles. As illustrated, the iron concentration in the aluminum is reduced from 0.53 wt. % to approximately 0.05 wt. % at the solidification point of fcc aluminum (592° C.). However, a separation that realizes 0.05 wt. % iron in the bulk aluminum without removing solid aluminum is likely not possible. Thus, in one approach intermetallic particles are removed (e.g., by filtration) above the aluminum solidification temperature (e.g., 10-20° C. above), thereby avoiding the removal of solid aluminum.

Example 2

Purifying aluminum alloys by adding intermetallic formers and removing the iron-bearing intermetallic particles may be performed on a variety of aluminum alloys. In this regard, recyclability process models were constructed for other common aluminum alloy compositions. Pandat®, a thermodynamic simulation software, and an accompanying aluminum thermodynamic database, PanAluminum®, were utilized to construct process models. As described in greater detail below, intermetallic formers were chosen for each aluminum alloy composition. The mixture of the intermetallic formers and aluminum alloy provides the process simulation with an overall composition. The overall composition was utilized by Pandat® to determine the lowest iron concentration and the corresponding purification temperature window ($\Delta T$) of the mixture.

Intermetallic formers were chosen for each recycling process. The mass of intermetallic formers was chosen by a Java computer script that matches the amount of intermetallic formers with a composition in a simulation database that realizes a good separation result. In this approach, the mass of intermetallic formers was chosen based on maximizing $\Delta T$ and minimizing the iron concentration. The database of simulations comprised 11,520 simulations carried out using each combination of the elements and compositions provided in Table 2, below.

TABLE 2

Elements and Compositions of Simulation Database

| Element | Compositions (wt. %) |
|---|---|
| Fe | 0.5; 0.75, 1.0; 1.25, 1.5 |
| Mn | 0.1, 0.5; 1.0; 1.5; 2.0; 2.5 |
| Si | 1.0, 4.0, 7.0, 10.0, 13.0, 16.0, 19.0, 22.0 |
| Mg | 0.1; 0.4; 0.7 |

TABLE 2-continued

Elements and Compositions of Simulation Database

| Element | Compositions (wt. %) |
|---|---|
| Cu | 0.1, 0.25, 1.25, 2.25 |
| Zn | 0.1, 0.5; 1.5; 2.5 |

Figure 6A:
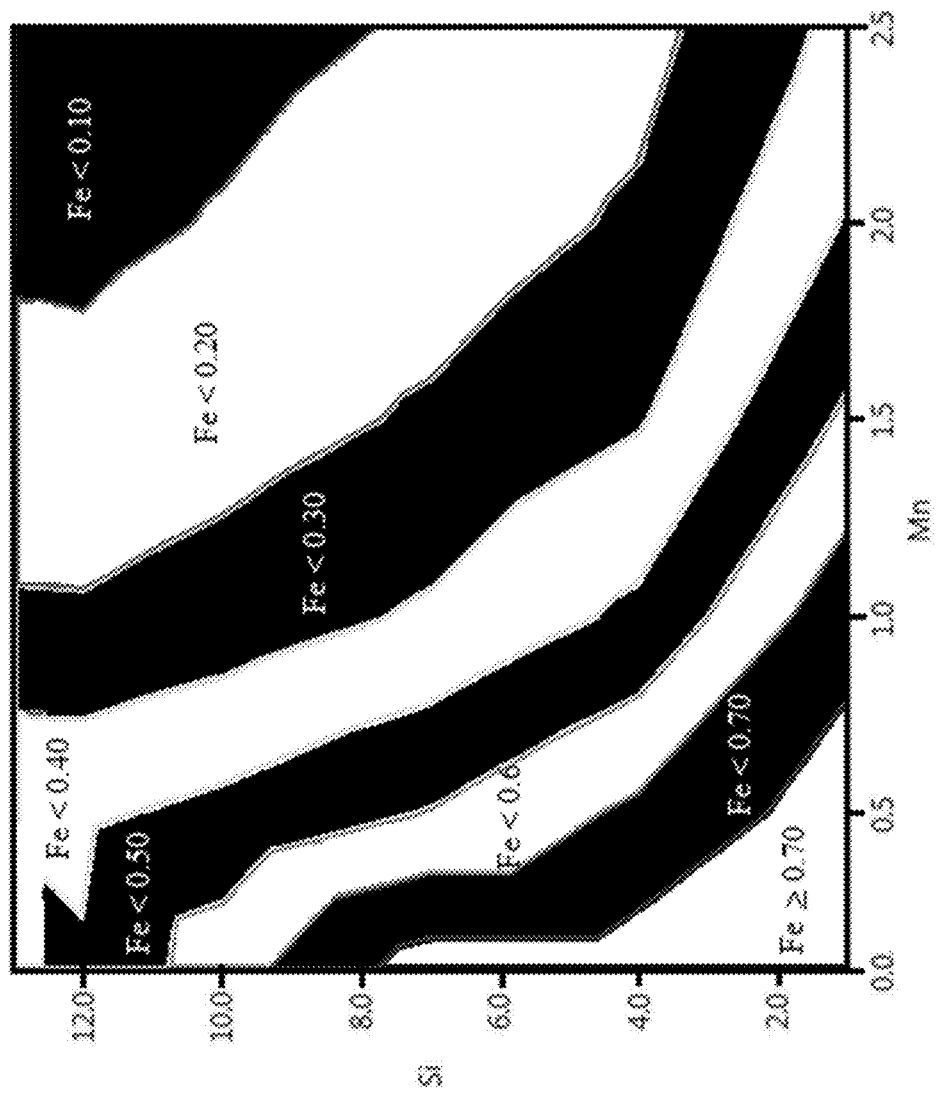
FIG. 6a is a contour plot illustrating the effect of adding intermetallic former materials Si and Mn on the lowest possible iron content in a recycling simulation.
Figure 6B:
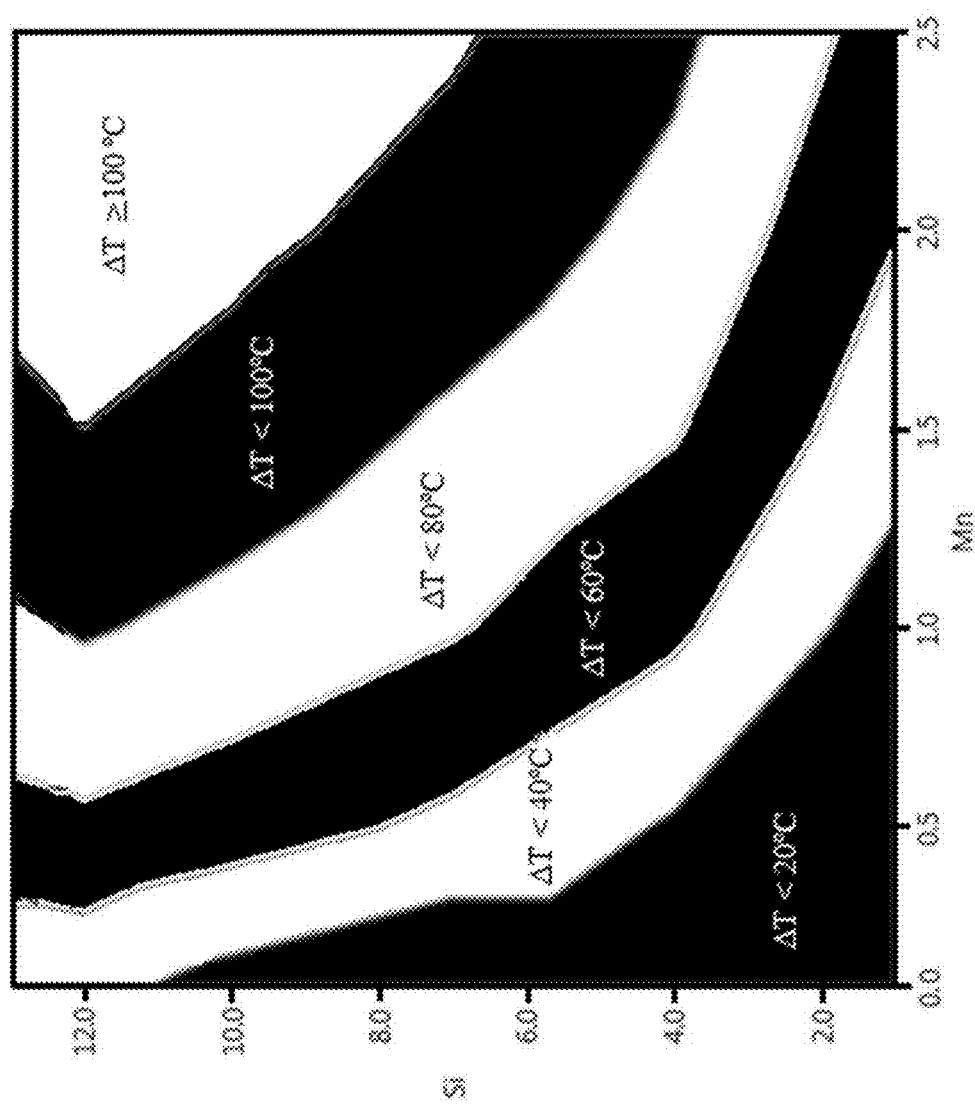
FIG. 6b is a contour plot illustrating the effect of adding intermetallic former materials Si and Mn on the purification temperature window in a recycling simulation.
Figure 6C:
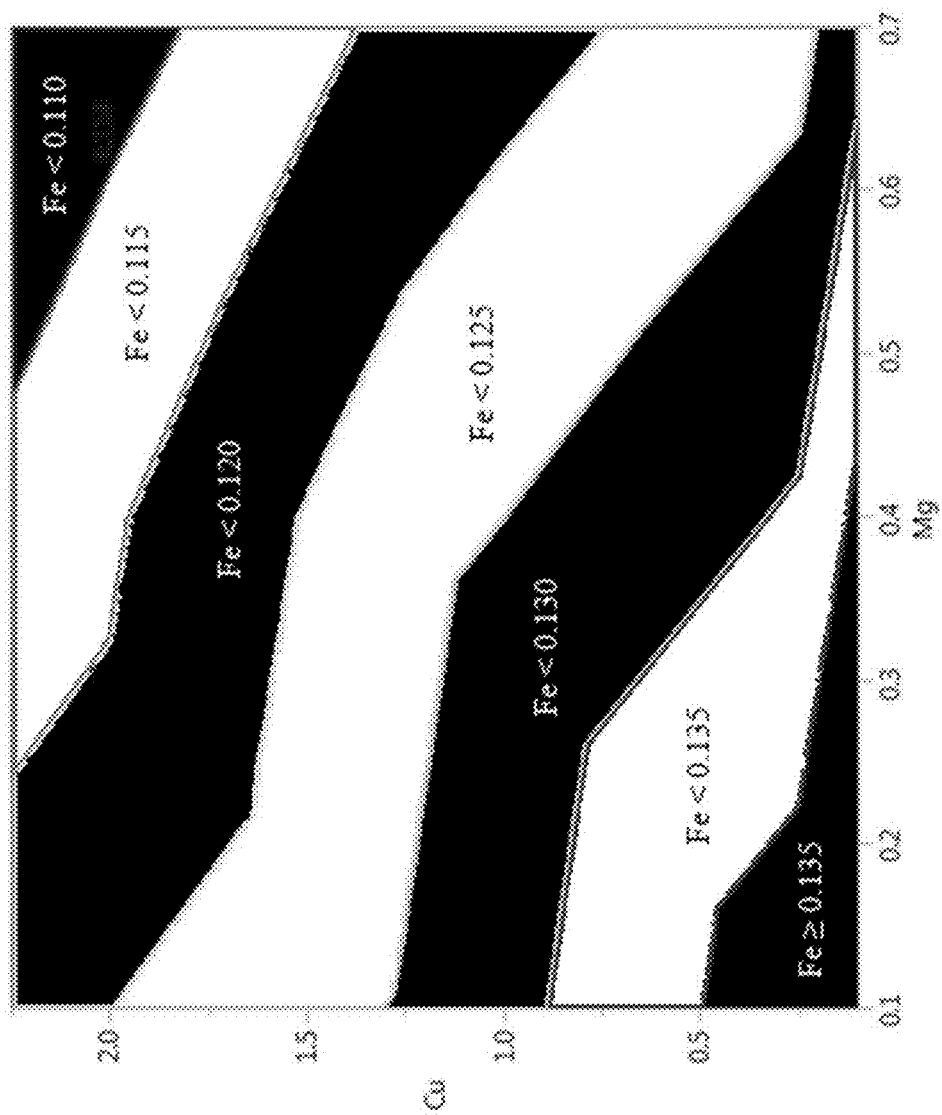
FIG. 6c is a contour plot illustrating the effect of adding alloying additions Cu and Mg on the lowest possible iron content in a recycling simulation.
Figure 6D:
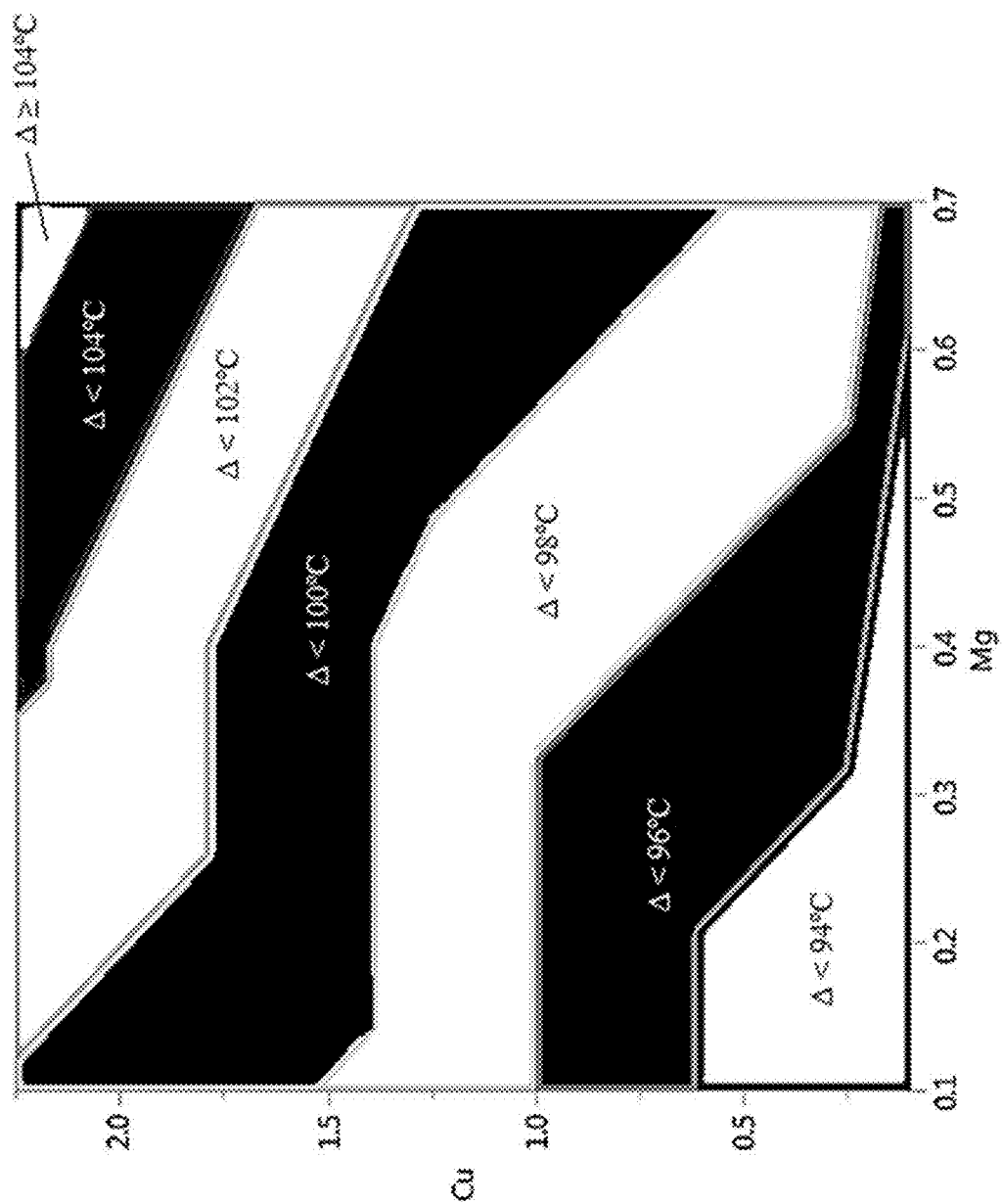
FIG. 6d is a contour plot illustrating the effect of adding alloying additions Cu and Mg on the purification temperature window in a recycling simulation.

The 11,520 simulations were then used to construct contour plots. Contour plots illustrating the effect of Mn and Si, as intermetallic formers, on the iron concentration and the purification temperature window are shown in FIGS. 6a-6b for an aluminum alloy having 2.25 wt. % Cu, 0.7 wt. % Mg, 0.5 wt. % Zn. As illustrated, increasing the Si and Mn content decreases the iron concentration and increases the purification temperature window. For the shown Si and Mn content ranges and given composition, the iron concentration varies from 0.10 to about 0.70 wt. % and the purification temperature window varies from 20° C. to about 100° C. Contour plots illustrating the effect of Cu and Mg on the lowest possible iron concentration and purification temperature window are shown in FIGS. 6c-6d for an aluminum alloy having 2.0 wt. % Mn, 10.0 wt. % Si, and 0.5 wt. % Zn. As illustrated, increasing the Cu and Mg content decreases the iron concentration, and increases the purification temperature window. For the shown Cu and Mg content ranges and given composition, the iron concentration varies from 0.11 to about 0.14 wt. % and the purification temperature window varies from 94° C. to about 104° C.

Example 3

Using the simulation methodology of Example 2, a simulation was performed on an alloy ("Alloy 3") having the composition shown in Table 3b, below. Intermetallic formers of manganese and silicon were added as (1) a manganese master alloy (85 wt. % Al and 15 wt. % Mn) and (2) as pure silicon. The simulation yielded a lowest possible iron composition of about 0.10 wt. % at a temperature of 600.2° C., providing a purification temperature window of about 77° C. The simulation shows that a final alloy composition having 0.13-0.17 wt. % iron will be realized by the removal of the intermetallic phases when the filtration is performed approximately 10-20° C. above the aluminum solidification temperature. The mass of Alloy 3 and intermetallic formers are provided below in Table 3a. The composition of Alloy 3, the melt composition (overall composition of Alloy 3 and intermetallic formers), and the final melt composition after purification are given in Table 3b. A complete set of data for the recycling simulation is shown in FIG. 7.

TABLE 3a

Mass of Materials of Example 3

| Material | Mass (lbs) |
|---|---|
| Alloy 3 | 1000 |
| 15% Al - 85% Mn Master Alloy | 11.2 |
| Pure Silicon | 91.8 |

TABLE 3b

Process Compositions of Example 3

| Element | Alloy 3 Composition (wt. %) | Melt Composition Prior to Purification (wt. %) | Melt Composition After Purification (wt. %) |
|---|---|---|---|
| Si | 0.75 | 9.00 | 8.94 |
| Fe | 0.57 | 0.52 | 0.13-0.17 |
| Cu | 0.20 | 0.18 | 0.19 |
| Mn | 1.03 | 1.80 | 0.63-0.74 |
| Mg | 0.50 | 0.45 | 0.47-0.48 |
| Cr | 0.09 | 0.08 | 0.08 |
| Ni | 0.05 | 0.05 | 0.05 |
| Zn | 0.12 | 0.11 | 0.12 |
| Ti | 0.05 | 0.04 | 0.04 |
| Zr | 0.02 | 0.01 | 0.01 |

Example 4

Using the methodology of Example 2, a simulation was performed on a mixture of two alloys ("Alloy 4a" and "Alloy 4b"), having the compositions shown in Table 4b, below. Alloy 4a is a typical 6061 aluminum alloy. Intermetallic formers of manganese, and silicon, were added as (1) a manganese master alloy (85 wt. % Al and 15 wt. % Mn), and (2) as pure silicon. Pure copper was also added to raise the copper level in the alloys to approximately 1.0 wt. %. The simulation yielded a lowest possible iron composition of about 0.08 wt. % at a temperature of about 594.9° C., providing a purification temperature window of about 105° C. The simulation shows a final alloy composition having 0.11-0.14 wt. % iron will be realized by the removal of the intermetallic phases when the filtration is performed at approximately 10-20° C. above the aluminum solidification temperature. The mass of Alloy 4a, Alloy 4b, Mn master alloy, pure Si, and pure copper are provided below in Table 4a. The compositions of Alloy 4a, Alloy 4b, the melt composition (overall composition of Alloy 4a, Alloy 4b, Mn master alloy, pure Si, and pure Copper), and the final melt composition after purification are given in Table 4b. A more complete set of data for the recycling simulation is given in FIG. 8.

TABLE 4a

Mass of Materials of Example 4

| Material | Mass (lbs) |
|---|---|
| Alloy 4a | 400 |
| Alloy 4b | 600 |
| 15% Al - 85% Mn Master Alloy | 10.7 |
| Pure Silicon | 96 |
| Pure Copper | 8 |

TABLE 4b

Process Compositions of Example 4

| Element | Alloy 4a Composition (wt. %) | Alloy 4b Composition (wt. %) | Melt Composition Prior to Purification (wt. %) | Melt Composition After Purification (wt. %) |
|---|---|---|---|---|
| Si | 0.6 | 0.82 | 9.27 | 9.25-9.26 |
| Fe | 0.7 | 0.23 | 0.37 | 0.11-0.14 |
| Cu | 0.275 | 0.42 | 1.03 | 1.07 |
| Mn | 0.15 | 0.99 | 1.40 | 0.58-0.69 |

TABLE 4b-continued

Process Compositions of Example 4

| Element | Alloy 4a Composition (wt. %) | Alloy 4b Composition (wt. %) | Melt Composition Prior to Purification (wt. %) | Melt Composition After Purification (wt. %) |
|---|---|---|---|---|
| Mg | 1.00 | 0.42 | 0.58 | 0.4-0.6 |
| Cr | 0.20 | 0.045 | 0.10 | 0.10 |
| Ni | 0.00 | 0.05 | 0.03 | 0.03 |
| Zn | 0.25 | 0.05 | 0.12 | 0.12 |
| Ti | 0.15 | 0.134 | 0.13 | 0.04 |

Example 5

Using the methodology of Example 2, a simulation was performed on a mixture of two alloys ("Alloy 5a" and "Alloy 5b"), having the compositions shown in Table 5b, below. Intermetallic formers of manganese and silicon were added as (1) a manganese master alloy (85 wt. % Al and 15 wt. % Mn), and (2) as pure silicon. The simulation yielded a lowest possible iron composition of about 0.08 wt. % at a temperature of about 592.7° C., providing a purification temperature window of about 84° C. The simulation shows a final alloy composition having 0.10-0.13 wt. % iron will be realized by the removal of the intermetallic phases when the filtration is performed at approximately 10-20° C. above the aluminum solidification temperature. The mass of Alloy 5a, Alloy 5b, Mn master alloy, and pure Si are provided below in Table 5a. The compositions of Alloy 5a, Alloy 5b, the melt composition (overall composition of Alloy 5a, Alloy 5b, Mn master alloy, and pure Si), and the final melt composition after purification are given in Table 5b. A more complete set of data for the recycling simulation is given in FIG. 9.

TABLE 5a

Mass of Materials of Example 5

| Material | Mass (lbs) |
|---|---|
| Alloy 5a | 400 |
| Alloy 5b | 600 |
| 15% Al - 85% Mn Master Alloy | 15 |
| Pure Silicon | 110 |

TABLE 5b

Process Compositions of Example 5

| Element | Alloy 5a Composition (wt. %) | Alloy 5b Composition (wt. %) | Melt Composition Prior to Purification (wt. %) | Melt Composition After Purification (wt. %) |
|---|---|---|---|---|
| Si | 0.75 | 0.82 | 10.48 | 10.48 |
| Fe | 0.57 | 0.53 | 0.49 | 0.10-0.12 |
| Cu | 0.2 | 0.11 | 0.13 | 0.14 |
| Mn | 1.03 | 1.03 | 2.05 | 0.64-0.74 |
| Mg | 0.5 | 0.0488 | 0.20 | 0.21 |
| Cr | 0.085 | 0.05 | 0.06 | 0.06 |
| Ni | 0.05 | 0.05 | 0.04 | 0.04 |
| Zn | 0.12 | 0.087 | 0.09 | 0.10 |
| Ti | 0.049 | 0.05 | 0.04 | 0.03 |
| Zr | 0.015 | 0.046 | 0.03 | 0.03 |

Example 6

Using the methodology of Example 2, a simulation was performed on a mixture of two alloys ("Alloy 6a" and "Alloy 6b"), having the compositions shown in Table 6b, below. Intermetallic former silicon was added as pure silicon. The simulation yielded a lowest possible iron composition of about 0.10 wt. % at a temperature of about 597.9° C., providing a purification temperature window of about 67° C. The simulation shows a final alloy composition having 0.12-0.16 wt. % iron will be realized by the removal of the intermetallic phases when the filtration is performed at approximately 10-20° C. above the aluminum solidification temperature. The mass of Alloy 6a, Alloy 6b, and pure Si are provided below in Table 6a. The compositions of Alloy 6a, Alloy 6b, the melt composition (overall composition of Alloy 6a, Alloy 6b, and pure Si), and the final melt composition after purification are given in Table 6b. A more complete set of data for the recycling simulation is given in FIG. 10.

TABLE 6a

Mass of Materials of Example 6

| Material | Mass (lbs) |
|---|---|
| Alloy 6a | 400 |
| Alloy 6b | 600 |
| Pure Silicon | 77.5 |

TABLE 6b

Process Compositions of Example 6

| Element | Alloy 6a Composition (wt. %) | Alloy 6b Composition (wt. %) | Melt Composition Prior to Purification (wt. %) | Melt Composition After Purification (wt. %) |
|---|---|---|---|---|
| Si | 1.5 | 2.35 | 9.06 | 9.05-9.06 |
| Fe | 0.22 | 0.25 | 0.22 | 0.12-0.16 |
| Cu | 0.53 | 0.45 | 0.45 | 0.46 |
| Mn | 0.92 | 1.05 | 0.93 | 0.63-0.74 |
| Mg | 0.35 | 0 | 0.13 | 0.13 |
| Cr | 0.06 | 0 | 0.02 | 0.02 |
| Ni | 0.05 | 0.03 | 0.04 | 0.04 |
| Zn | 0.75 | 0.8 | 0.72 | 0.73 |
| Ti | 0.07 | 0.1 | 0.08 | 0.04 |
| Zr | 0.007 | 0.01 | 0.01 | 0.01 |

Example 7

Using the methodology of Example 2, a simulation was performed on an alloy ("Alloy 7") having the compositions shown in Table 7b, below. Intermetallic former silicon was added as pure silicon. Pure copper was also added to raise the copper level in the alloys to approximately 1.9 wt. %. The simulation yielded a lowest possible iron composition of about 0.09 wt. % at a temperature of about 595.1° C., providing a purification temperature window of about 100° C. The simulation shows a final alloy composition having 0.12-0.15 wt. % iron will be realized by the removal of the intermetallic phases when the filtration is performed at approximately 10-20° C. above the aluminum solidification temperature. The mass of Alloy 7, Mn master alloy, and pure Si are provided below in Table 7a. The compositions of Alloy 7, the melt composition (overall composition of Alloy 7, pure silicon, and pure copper), and the final melt composition after purification are given in Table 7b. A more complete set of data for the recycling simulation is given in FIG. 11.

TABLE 7a

Mass of Materials of Example 7

| Material | Mass (lbs) |
|---|---|
| Alloy 7 | 1000 |
| Pure Silicon | 92 |
| Pure Copper | 16 |

TABLE 7b

Process Compositions of Example 7

| Element | Alloy 7 Composition (wt. %) | Melt Composition Prior to Purification (wt. %) | Melt Composition After Purification (wt. %) |
|---|---|---|---|
| Si | 0.82 | 9.04 | 9.04-9.05 |
| Fe | 0.23 | 0.21 | 0.12-0.15 |
| Cu | 0.42 | 1.82 | 1.84-1.85 |
| Mn | 0.99 | 0.89 | 0.89 |
| Mg | 0.042 | 0.04 | 0.04 |
| Cr | 0.045 | 0.04 | 0.04 |
| Ni | 0.05 | 0.05 | 0.05 |
| Zn | 0.05 | 0.05 | 0.05 |
| Ti | 0.134 | 0.12 | 0.12 |
| Zr | 0.055 | 0.05 | 0.05 |

What is claimed is:

1. A method comprising:
   (a) melting aluminum alloy scrap, thereby producing a melt, wherein the aluminum alloy scrap comprises an initial iron content, wherein the initial iron content is at least 0.20 wt. % iron (Fe);
   (b) adding an excess of manganese (Mn) to the melt, wherein the excess of manganese is an amount of manganese sufficient to produce both (i) iron-bearing intermetallic particles in the melt and (ii) a Mn-based aluminum alloy from the melt;
   (c) forming iron-bearing intermetallic particles in the melt, wherein a first amount of manganese reacts with iron of the melt to form the iron-bearing intermetallic particles, and wherein a second amount of manganese remains in the melt in unreacted form, the second amount of manganese corresponding to an amount of the excess manganese employed in the adding step (b) required to create the Mn-based aluminum alloy from the melt;
   (d) removing at least some of the iron-bearing intermetallic particles from the melt, thereby producing a low-iron melt with the second amount of manganese therein;
   (e) solidifying the low-iron melt, thereby producing the Mn-based aluminum alloy having the second amount of manganese therein, wherein the Mn-based aluminum alloy comprises a purified iron content, wherein the purified iron content is less than the initial iron content and not greater than 0.5 wt. % Fe, and wherein the Mn-based aluminum alloy includes manganese as the predominate alloying ingredient besides aluminum.

2. The method of claim 1, comprising:
   after the removing step (d) and prior to the solidifying step (e), adding other alloying additions to the low-iron melt, wherein the other alloying additions are selected from the group consisting of chromium, nickel, zinc, titanium, tin, strontium, copper, magnesium, and combinations thereof;
   wherein, after the solidifying step (e), the Mn-based aluminum alloy includes the other alloying additions.

3. The method of claim 1, wherein the Mn-based aluminum alloy includes from 0.05 to 1.8 wt. % Mn.

4. The method of claim 3, wherein the Mn-based aluminum alloy includes at least 0.20 wt. % Mn.

5. The method of claim 3, wherein the Mn-based aluminum alloy includes at least 0.30 wt. % Mn.

6. The method of claim 3, wherein the Mn-based aluminum alloy includes at least 0.40 wt. % Mn.

7. The method of claim 4, wherein the Mn-based aluminum alloy includes not greater than 1.5 wt. % Mn.

8. The method of claim 5, wherein the Mn-based aluminum alloy includes not greater than 1.2 wt. % Mn.

9. The method of claim 6, wherein the Mn-based aluminum alloy includes not greater than 0.9 wt. % Mn.

10. The method of claim 1, comprising, during the adding step (b), further adding silicon to the melt.

11. The method of claim 1, comprising, after the removing step (d) and prior to the solidifying step (e), adding alloying additions to the low-iron melt, wherein the alloying additions is one of (i) copper, (ii) magnesium, or (iii) both copper and magnesium, wherein, after the solidifying step (e), the Mn-based aluminum alloy includes the alloying additions.

12. The method of claim 1, comprising, during the adding step (b), adding copper to the melt.

13. The method of claim 1, wherein the purified aluminum alloy comprises not greater than 0.20 wt. % iron (Fe).

14. The method of claim 1, wherein the purified aluminum alloy comprises not greater than 0.15 wt. % iron (Fe).

15. The method of claim 1, wherein the forming step (c) comprises cooling the melt from a first temperature to a second temperature, thereby producing the iron-bearing intermetallic particles.

16. The method of claim 15, comprising completing the removing step (d) at the second temperature, wherein the second temperature is at least 10° C. higher than a solidification temperature of fcc aluminum.

17. The method of claim 1, wherein the removing step (d) comprises filtering the melt using a refractory filter material.

18. The method of claim 1, wherein the Mn-based aluminum alloy comprises at least 0.58 wt. % Mn.

19. The method of claim 1, wherein the melt comprises from 1.40 to 2.05 wt. % Mn prior to forming the iron-bearing intermetallic particles during the forming step (c).

20. The method of claim 1, wherein the Mn-based aluminum alloy is a 3xxx aluminum alloy.

\* \* \* \* \*